(12) United States Patent
Kiehne

(10) Patent No.: US 8,766,846 B2
(45) Date of Patent: Jul. 1, 2014

(54) ACCIDENT PREVENTION SYSTEM AND A VEHICLE INCLUDING THE ACCIDENT PREVENTION SYSTEM

(75) Inventor: Bruce Leigh Kiehne, Shailer Park (AU)

(73) Assignee: Surveillance Guard Co Pty Ltd, Queensland (AU)

(*) Notice: Subject to any disclaimer, the term of this patent is extended or adjusted under 35 U.S.C. 154(b) by 30 days.

(21) Appl. No.: 13/447,159

(22) Filed: Apr. 13, 2012

(65) Prior Publication Data

US 2012/0326917 A1 Dec. 27, 2012

(30) Foreign Application Priority Data

Jun. 24, 2011 (AU) .............................. 2011902483

(51) Int. Cl.
*G01S 13/00* (2006.01)
*B60Q 1/00* (2006.01)
*B60Q 1/50* (2006.01)
*G08G 1/123* (2006.01)
*G01S 15/00* (2006.01)
*G06G 7/00* (2006.01)

(52) U.S. Cl.
USPC ............. 342/71; 340/435; 340/436; 340/453; 340/467; 340/988; 367/96; 367/99; 701/70

(58) Field of Classification Search
CPC ........ B60T 1/00; B60T 7/00; B60T 2201/00; B60T 13/74; B60T 2250/06; B60T 2250/042; B60T 17/22; B60T 17/225; B60T 5/00; B60T 2201/03; B60T 2230/08; B60T 7/12; B60T 15/041; B60T 15/043; B60T 8/17; B60T 8/3205; B60T 11/043; G01S 15/00; G01S 2013/9378; G01S 2013/9346; G01S 2013/9353; B60Q 9/007; B60W 10/18; B60W 10/20; B60W 10/119; B60W 30/02; B62D 15/021; B62D 15/027; B62D 15/028; G08G 1/20; G08G 1/01

USPC .......... 340/428, 462, 427, 932.2, 450.1, 453, 340/457.3, 479, 933, 942, 425.5, 435, 438; 701/70; 307/10.2, 9.1, 10.3, 10.5, 10.6; 303/3, 122.09, 89, 124, 3.89; 342/71
See application file for complete search history.

(56) References Cited

U.S. PATENT DOCUMENTS

| | | | |
|---|---|---|---|
| 4,407,388 A | 10/1983 | Steel | |
| 4,664,218 A | 5/1987 | Graham et al. | |
| 5,572,484 A * | 11/1996 | Gaus et al. | 367/99 |
| 6,433,679 B1 * | 8/2002 | Schmid | 340/435 |
| 6,450,587 B1 | 9/2002 | MacGregor et al. | |
| 6,648,477 B2 | 11/2003 | Hutzel et al. | |
| 6,788,190 B2 * | 9/2004 | Bishop | 340/435 |
| 2002/0017412 A1 * | 2/2002 | Pietsch et al. | 180/169 |
| 2003/0006644 A1 * | 1/2003 | MacGregor et al. | 303/3 |
| 2004/0040771 A1 | 3/2004 | Ploucha | |
| 2006/0006988 A1 * | 1/2006 | Harter et al. | 340/435 |
| 2007/0080584 A1 | 4/2007 | Li | |
| 2008/0157948 A1 * | 7/2008 | Swannie | 340/436 |
| 2008/0174455 A1 * | 7/2008 | Staerzl | 340/984 |
| 2010/0289885 A1 | 11/2010 | Lu et al. | |
| 2011/0082631 A1 | 4/2011 | Busack et al. | |

FOREIGN PATENT DOCUMENTS

| | | |
|---|---|---|
| AU | 2003266445 A1 | 6/2005 |
| AU | 2006300693 B2 | 4/2007 |
| AU | 2010201626 A1 | 11/2010 |
| CN | 1566986 A | 1/2005 |
| CN | 101941437 A | 1/2011 |
| CN | 201009834 Y | 1/2011 |
| GB | 2473551 A | 3/2011 |
| GB | 2479998 A * | 11/2011 |
| JP | 2009103176 A | 5/2009 |
| KR | 20070065114 A | 6/2007 |
| KR | 20080014230 A | 2/2008 |
| KR | 100820463 B1 | 4/2008 |
| KR | 100860930 B1 | 9/2008 |
| KR | 20100061870 A | 6/2010 |
| KR | 20110093726 A | 8/2011 |
| WO | 2008068142 A1 | 6/2008 |

OTHER PUBLICATIONS

Preservation Solutions Pty Ltd et al., International Search Report and Written Opinion issued in related International Patent Application PCT/AU2012/000250 on May 18, 2012.

Surveillance Guard Co. Limited (previously Preservation Solutions Pty Ltd et al.), International Preliminary Report on Patentability issued for International Patent Application No. PCT/AU2012/000250 on Dec. 24, 2013.

\* cited by examiner

*Primary Examiner* — Jennifer Mehmood
*Assistant Examiner* — Mirza Alam
(74) *Attorney, Agent, or Firm* — David A. Farah; Sheldon Mak & Anderson PC

(57) ABSTRACT

A vehicle with an accident prevention system is disclosed. The vehicle also has a foot brake for stopping the vehicle. The system includes a sensor arrangement for sensing an object behind a rear end of the vehicle that generates an object recognition signal when it senses an object within range behind the vehicle. The sensor arrangement includes passive IR sensors or reflected pulse sensors such as sonar or radar sensors on the rear end. A controller generates an accident prevention response signal on receiving an object recognition signal from the sensor arrangement. A brake applicator is operatively coupled to the brake to stop the vehicle when the controller generates a response signal. Conveniently the system includes an alarm for sounding an alarm signal. A method for preventing an accident where a vehicle which is reversing at low speed collides with a person is also disclosed.

29 Claims, 17 Drawing Sheets

ACCIDENT PREVENTION SYSTEM AND A VEHICLE INCLUDING THE ACCIDENT PREVENTION SYSTEM

CROSS-REFERENCE TO RELATED APPLICATION

The present Application claims the benefit of Australian Provisional Patent Application No. 2011902483 titled "An Accident Prevention System and a Vehicle Including the Accident Prevention System," filed Jun. 24, 2011, the contents of which are incorporated herein by reference in their entirety.

FIELD OF THE INVENTION

This invention relates to an accident prevention system for use on vehicles and to a vehicle including the accident prevention system. This invention also relates to a method of preventing an accident when a vehicle collides with an object.

This invention relates particularly but not exclusively to an accident prevention system for preventing a small child or animal being run over by a motor vehicle that is reversing at low speed on a travel surface such as a driveway. It will therefore be convenient to hereinafter describe the invention with reference to this example application. However at the same time it is to be clearly understood that the invention is capable of broader application. For example the invention extends to all forms of vehicles and not just motor vehicles. It also extends to a system for preventing reversing accidents with inanimate objects such as posts and walls. It is not limited to a system for preventing reversing accidents involving small children.

DEFINITIONS

In this specification the term 'reversing accident' will be used to describe and define a motor vehicle accident that occurs when a vehicle travelling at low speed in reverse gear collides with an object or a person or an animal. It includes a vehicle accident in a driveway involving a small child but is not limited to this class of accidents.

In this specification the term 'accident prevention' shall be understood to mean a system that is useful in helping to prevent accidents. However it is to be clearly understood that it does not mean that it is capable of preventing all accidents from occurring. In reality it helps to avoid accidents or resists accidents but does not eliminate the chance of an accident completely.

In this specification the term 'mammal' shall be understood to mean any warm blooded creature that meets the scientific definition of a land mammal but excluding mammals that live in water.

In this specification the term 'heat sensor' shall be interpreted to mean a passive IR sensor that can sense IR radiation or heat generated by a mammal such as a human being or an animal such as a dog or cat. Such mammals have a body temperature in the range of 35 to 39 degrees Celsius.

In this specification the term 'IR sensing zone' shall be interpreted to mean a zone extending away from the IR sensor/s within which a mammal will be sensed by the sensors.

BACKGROUND TO THE INVENTION

Motor vehicles and particularly motor cars are a ubiquitous feature of modern society that is widely used to convey people and goods from one location to another. They provide people with an independence of mobility and travel that is desirable in a modern society. Vehicles are often parked in a parking zone that is a garage or parking bay when they are not being used. In many cases the parking zone opens onto a driveway which in turn leads to a road. Often the parking zone and driveway are not fenced off from an adjacent garden and they have open access to the land or garden around a house that is associated with the driveway. That is the garden opens onto the parking zone and driveway without any pedestrian barrier therebetween.

In these situations it is sometimes necessary to reverse the vehicle out of the parking zone along a driveway leading to an adjacent road. The vehicle is driven in reverse at low speed in reverse along the driveway to the street where it can be driven in the normal way. To reverse the vehicle the driver engages reverse gear, turns their head around and looks through the back window at the ground or support surface behind the vehicle. One problem is that the driver's view of the driveway behind the vehicle is very limited and they do not have a full and uninterrupted view of the vehicle's travel path. Accident statistics show that many motor vehicle accidents occur in this situation.

In one class of reversing accidents a driver will collide with an inanimate object such as a wall or post. While such accidents cause damage to physical objects which entail an economic cost they do not cause any human trauma. In another more problematic category of reversing accidents a driver will collide with a small child or small animal. The child or animal is usually positioned behind the vehicle and is not seen by the driver when they reverse the vehicle. If it is a young child, the child is often too young to be aware of the danger to them posed by the reversing vehicle. Consequently they usually do not take any avoiding action. Sometimes the driver does not see the child because they have limited vision through the rear window of the vehicle. Further some drivers find it awkward to turn around and look through the rear of the vehicle and sometimes do not even bother to do this. Yet further the driver might not thoroughly and carefully check that the area behind the vehicle is clear people before the vehicle starts reversing. Yet further sometimes driver simply start reversing and hope that anyone in the way will take avoiding action.

Applicant understands that reversing car accidents cause about 229 fatalities a year in the USA. They cause about 12 fatalities a year in Australia and about 4 fatalities a year in New Zealand. Jeanette Fennell, who is the founder and co-president of the non-profit foundation Kidsandcars.org, advises that about 50 children each week in the USA are the victims of reversing car accidents. Of these 48 children are treated in emergency rooms and 2 are killed. Further statistics show that children under the age of three years are those most likely to be the victims of reversing car accidents. Further where the children are not killed in these accidents they usually sustain severe head, chest or lower limb injuries. The statistics reveal that the driver of the reversing vehicle is usually driving very slowly when the accident occurs. Further the driver of the vehicle is usually a parent, family member or friend of the child that is run over which adds to the trauma caused by these accidents.

FIG. 1 of the drawings illustrates one example scenario in which a young child is seated on the ground playing with a toy just behind a motor vehicle that is about to reverse out of a driveway. The small child is seated on the ground close to the back of the vehicle and is centrally positioned with respect to the vehicle. This makes it virtually impossible for the driver to see the child from their position seated in the driver's seat of the vehicle even if they are diligent. Accordingly unless someone outside the vehicle alerts the driver to the presence of the small child, or the driver actually sees the child in this position prior to getting into the vehicle, there is a real risk of the child being run over by the reversing vehicle.

FIG. 2 of the drawings illustrates another example scenario in which a young child could be run over by a reversing vehicle. As shown in the drawings the child is riding a tricycle on a hard paved surface of a driveway just behind the vehicle. The child has a very low profile or height and is thus not easily visible to a driver of the reversing motor vehicle. The situation is exacerbated by the fact that the child on the tricycle is constantly moving about as distinct from being in a fixed position. Thus a driver may think the child is positioned outside of a reversing zone or travel path of the vehicle when they reverse the vehicle when that is not the case.

The applicant is aware of some prior art efforts that have been made to assist a driver of a motor vehicle to reduce the risk of a reversing accident occurring. One prior art attempt to address this problem involves the use of reversing cameras that are either integrated into a vehicle at the time of manufacture or supplied as an after-market product. The reversing cameras project a visual image of the reversing zone behind the vehicle. The reversing cameras are mounted on the rear of a vehicle and are operatively coupled to an LED screen that is mounted within the cabin of the motor vehicle in a position in which it is visible to the driver. Some screens are mounted on the dashboard while other screens have been mounted on the rear view mirrors. The idea is that the image of the area behind the vehicle can then be observed by a driver when they reverse the motor vehicle. These types of devices have been around for some time and can be retrofitted to existing vehicles. They are designed to assist a driver when parking their vehicle. Sonar parking sensors work by sending out sound pulses from sensors mounted in the rear of the vehicle. The sonar pulse bounces off an object and returns to the sensor and a CPU associated with the sensor measures the time taken for the sound wave to return to the sensor. This provides a measure of the distance of the object away from the sonar sensor and thereby the rear of the vehicle. When the calculated distance comes within a predetermined range then the CPU sends a signal to an alarm inside the cabin of the vehicle to alert the driver to the existence of an object within a range of the rear end of the vehicle. However in the Applicant's view this prior art product has not been very successful. Applicant is aware of a number of instances a motor vehicle equipped with reversing cameras and sonar parking sensors has run over a child. That is the cameras of the reversing zone and the image of the reversing zone displayed within the driver's cabin of the vehicle did not operate or intervene to prevent an accident. Yet further Applicant believes that sonar parking sensors are not very reliable and are often ignored by the driver and cannot be fitted to a vehicle that is used for towing a boat, trailer or caravan.

Applicant believes that one problem of this prior art system is that when a person is driving a vehicle in reverse their head is turned around and they are looking out of the rear window of the vehicle. Consequently they are not able to look at a display screen mounted on the dashboard because this would require their head to face forwards. The technique whereby a driver turns their head around is shown in FIG. 3 of the drawings.

Further if a driver is in a hurry when they reverse a car out of a parking bay or driveway, they may not take the time to carefully check the image on the screen generated by the reversing cameras before they start moving. Once they have started moving it is difficult to look at the screen on the dashboard when their head is turned around facing out of the back of the motor vehicle. Yet another problem identified by the Applicant is that drivers are often distracted by mobile phones, radio or music within the car and/or other passengers within the car and either cannot hear the parking sensor alarms or ignore the parking sensor alarms. In summary the prior systems described above rely solely and exclusively on the actions and behaviour and ability of the driver and they have been found to be wanting. Further these systems do not warn anybody outside of the vehicle of an imminent danger of a collision.

Clearly it would be advantageous if a contrivance and/or a method could be devised that was able to effectively reduce the number of reversing accidents involving small children. This would reduce the amount of road trauma including death and serious injury involving small children and would undoubtedly have a significant benefit to society. This is particularly the case when one recognizes that very often the children are run over by a close friend or parent.

SUMMARY OF THE INVENTION

According to one aspect of this invention there is provided an accident prevention system for use on a vehicle having a front end and a rear end, the accident prevention system including:

a sensor arrangement for mounting on the vehicle for sensing an object rearward of the rear end of the vehicle, and that generates an object recognition signal when it senses an object satisfying a certain condition;

a controller that is operatively coupled to the sensor arrangement and that generates an accident prevention response signal on receiving an object recognition signal from the sensor arrangement; and a brake applicator that is operatively coupled to a brake of the vehicle in use, the brake applicator is operatively connected to the controller and applies the brake of the vehicle when the controller generates a said accident prevention response signal whereby to resist movement of the vehicle.

The sensor arrangement may include an IR sensor arrangement that senses IR heat and that generates an object recognition signal when it senses an object satisfying the condition that it radiates IR heat corresponding to a mammal, and sends it to the controller.

The IR sensor arrangement may comprise at least one IR sensor that is mounted on the rear end of the vehicle, e.g. a single IR sensor mounted on the rear end or a plurality of IR sensors that are spaced apart across the rear end of the vehicle.

The sensor arrangement may include a reflected pulse sensor arrangement that transmits pulses of electromagnetic radiation away from the rear end of the vehicle and senses return pulses returning to the sensor arrangement. The sensor arrangement may generate an object recognition signal when it senses an object satisfying the condition that it is within a certain range of the rear end of the vehicle, and sends the object recognition signal to the controller.

The reflected pulse sensor arrangement may generate an object recognition signal when it identifies objects within a range that is a distance of less than 2.0 m (meter) of the rear end of the vehicle, e.g. within a range that is a distance of 1.0 m to 2.0 m of the rear end of the vehicle, e.g. a distance of 1.0 m to 1.5 m.

The reflected pulse sensor arrangement may comprise one or more reflected pulse sensors that are positioned on the rear end of the vehicle.

The one or more reflected pulse sensors may comprise sonar sensors that pulse sound waves and sense when the sound waves return to the sensor arrangement. Instead the reflected pulse sensor arrangement may comprise a radar sensor arrangement that pulses radio waves and senses when the radio waves return to the sensor arrangement. Further instead the reflected pulse sensor arrangement may comprise a microwave sensor arrangement that pulses microwaves and senses when they return to the sensor arrangement.

The sensor arrangement may include: an IR sensor arrangement that senses IR heat and that generates an object recognition signal when it senses an object satisfying the condition that it radiates IR heat corresponding to a mammal, and sends it to the controller; and a reflected pulse sensor arrangement that transmits pulses of electromagnetic radiation away from the rear end of the vehicle and senses return pulses returning to the sensor arrangement, and the sensor arrangement generates an object recognition signal when it senses an object satisfying the condition that it is within a certain range of the rear end of the vehicle, and sends the object recognition signal to the controller.

The IR sensor arrangement may comprise one or more passive IR sensors and the reflected pulse sonar arrangement may comprise a plurality of sonar sensors.

The brake applicator may include a solenoid that is operatively connected to the controller, a brake mounting member and a cable operatively coupling the brake mounting member to the solenoid.

The accident prevention system may further include an alarm that is operatively connected to the controller, and the alarm may issue an alarm signal on receiving an accident prevention response signal from the controller. The alarm may include a siren that issues an audio alarm signal and the alarm may further include a visual alarm in the form of a flashing light that is visible to persons outside of the vehicle.

The controller may be a central processing unit contained within a control housing, and the CPU may be wired to the sensor arrangement and the CPU may be wired to the brake applicator and to the alarm.

The brake applicator may be operatively mounted on the operating foot brake of the vehicle that is used when the vehicle is driven on the road. Instead the brake applicator may be operatively mounted on another brake of the vehicle such as a park brake, e.g. a hand operated park brake or a foot operated park brake.

According to another aspect of this invention there is provided an accident prevention system for use on a vehicle having a front end and a rear end, the accident prevention system including:

a sensor arrangement for mounting on a motor vehicle for sensing an object rearward of the rear end of the vehicle, and that generates an object recognition signal when it senses an object satisfying a certain condition; and a controller that is operatively coupled to the sensor arrangement and that generates an accident prevention response signal on receiving an object recognition signal from the sensor arrangement.

The sensor arrangement may include an IR sensor arrangement that senses IR heat and that generates an object recognition signal when it senses an object satisfying the condition that it radiates IR heat corresponding to a mammal, and sends it to the controller. The IR sensor arrangement may include any one or more of the features of the IR sensor arrangement defined in the preceding aspect of the invention.

The sensor arrangement may also include a reflected pulse sensor arrangement that transmits pulses of electromagnetic radiation away from the rear end of the vehicle and senses return pulses returning to the sensor arrangement. The sensor arrangement may generate an object recognition signal when it senses an object satisfying the condition that it is within a certain range of the rear end of the vehicle, and sends the object recognition signal to the controller.

The reflected pulse sensor arrangement may be a sonar pulse sensor arrangement, a radar pulse sensor arrangement or a microwave pulse sensor arrangement. In particular the reflected pulse sensor arrangement may include any one or more of the features of the reflected pulse sensor arrangement defined in the preceding aspect of the invention.

The accident prevention system may include a brake applicator that is operatively coupled to a brake of the vehicle in use, the brake applicator is operatively connected to the controller and applies the brake of the vehicle when the controller generates a said accident prevention response signal whereby to resist movement of the vehicle. The brake applicator may include any one or more of the features of the brake applicator defined in the preceding aspect of the invention.

According to another aspect of this invention there is provided a vehicle having an accident prevention system installed thereon, the vehicle including:

a vehicle body having a front end and a rear end mounted on ground engaging formations that permit the vehicle body to travel across a surface, the vehicle including at least one brake for stopping the vehicle;

a sensor arrangement mounted on the vehicle for sensing an object rearward of the rear end of the vehicle, and that generates an object recognition signal when it senses an object satisfying a certain condition;

a controller that is operatively coupled to the sensor arrangement and that generates an accident prevention response signal on receiving an object recognition signal from the sensor arrangement; and a brake applicator that is operatively coupled to a said brake, the brake applicator is operatively connected to the controller and applies the brake when the controller generates a said accident prevention response signal whereby to resist movement of the vehicle.

The sensor arrangement may include an IR sensor arrangement that senses IR heat and that generates an object recognition signal when it senses an object satisfying the condition that it radiates IR heat corresponding to a mammal, and sends it to the controller. In particular the IR sensor arrangement may comprise at least one IR sensor that is mounted on the rear end of the vehicle.

The sensor arrangement may include a reflected pulse sensor arrangement that transmits pulses of electromagnetic radiation away from the rear end of the vehicle and senses return pulses returning to the sensor arrangement. The sensor arrangement generates an object recognition signal when it senses an object satisfying the condition that it is within a certain range of the rear end of the vehicle, and sends the object recognition signal to the controller.

The reflected pulse sensor arrangement may generate an object recognition signal when it identifies objects within a range of less than 2.0 m of the rear end of the vehicle. In particular the reflected pulse sensor arrangement may generate an object recognition signal when it identifies objects within a range that is a distance of 1.0 m to 2.0 m of the rear end of the vehicle, e.g. a distance of 1.0 m to 1.5 m.

The reflected pulse sensor arrangement may comprise one or more reflected pulse sensors that are positioned on the rear end of the vehicle.

The one or more reflected pulse sensors may comprise sonar sensors that pulse sound waves and sense when the sound waves return to the sensor arrangement. Instead the reflected pulse sensor arrangement may comprise a radar sensor arrangement that pulses radio waves and senses when they return to the sensor arrangement. Further instead the reflected pulse sensor arrangement may comprise a microwave sensor arrangement that pulses microwaves and senses when they return to the sensor arrangement. Yet further instead the reflected pulse sensor arrangement may utilise many other forms of electromagnetic radiation within the electromagnetic spectrum.

The sensor arrangement may include: an IR sensor arrangement that senses IR heat and that generates an object recognition signal when it senses an object satisfying the condition that it radiates IR heat corresponding to a mammal, and sends it to the controller; and a reflected pulse sensor arrangement that transmits pulses of electromagnetic radiation away from the rear end of the vehicle and senses return pulses returning to the sensor arrangement, and the sensor arrangement generates an object recognition signal when it senses an object satisfying the condition that it is within a certain range of the rear end of the vehicle, and sends the object recognition signal to the controller.

In this form of the invention the IR sensor arrangement may comprise one or more passive IR sensors and the reflected pulse sonar arrangement may comprise a plurality of sonar sensors.

The brake applicator may include a solenoid that is operatively connected to the controller, a brake mounting member and a cable operatively coupling the brake mounting member to the solenoid.

The solenoid may comprise a solenoid housing having at least electrical coil and a plunger received within the housing. The accident prevention response signal from the controller may energise the electrical coil/s and displaces the plunger within the solenoid housing which in turn through the cable displaces the brake mounting member by a corresponding distance and thereby applies the brake.

The accident prevention system on the vehicle may include a mechanical arrangement that enables the solenoid plunger to be displaced into contact with a holding coil switch whilst being attached to said cable, whereby to enable the cable to extend fully into contact with the holding coil switch when its movement is otherwise restricted.

The accident prevention system on the vehicle may further include an alarm that is operatively connected to the controller, and the alarm may issue an alarm signal on receiving an accident prevention response signal from the controller.

The vehicle body may include a cabin within which a driver's seat is located, and the alarm may include a siren or horn mounted on the vehicle outside of the cabin that issues an audio alarm signal. The alarm may further include an audio and/or visual alarm mounted on the vehicle inside the cabin. The audio alarm may make a loud noise and the visual alarm may include a flashing light that is visible to persons outside of the vehicle.

The sensor arrangement, the brake applicator and the alarm may include any one or more of the features of these components as defined in the first aspect of the invention above.

The vehicle may be a production or factory produced production motor vehicle with its own engine that can be driven on public roads. The brake that is applied by the accident prevention system may be the foot brake on the vehicle that is used to stop the vehicle when it is travelling on the road.

According to another aspect of this invention there is provided a vehicle having an accident prevention system installed thereon, including:
a vehicle body having a front end and a rear end mounted on ground engaging formations that permit the vehicle body to travel across a surface, the vehicle including at least one brake for stopping the vehicle;
a sensor arrangement mounted on the vehicle for sensing an object rearward of the rear end of the vehicle, and that generates an object recognition signal when it senses an object satisfying a certain condition; and
a controller that is operatively coupled to the sensor arrangement and that generates an accident prevention response signal on receiving an object recognition signal from the sensor arrangement.

The sensor arrangement may include an IR sensor arrangement that senses IR heat and that generates an object recognition signal when it senses an object satisfying the condition that it radiates IR heat corresponding to a mammal, and sends it to the controller.

The IR sensor arrangement may include any one or of the features of the IR sensor arrangement defined in any of the preceding aspects of the invention.

The sensor arrangement may include a reflected pulse sensor arrangement that transmits pulses of electromagnetic radiation away from the rear end of the vehicle and senses return pulses returning to the sensor arrangement, and the sensor arrangement generates an object recognition signal, when it senses an object satisfying the condition that it is within a certain range of the rear end of the vehicle, and sends the object recognition signal to the controller.

The reflected pulse sensor arrangement may utilise sonar waves, radio waves, or microwaves and may include any one or more of the features of the reflected pulse sensor arrangement defined in any of the preceding aspects of the invention.

The vehicle may include an alarm and the alarm may include any one or more of the features of the alarm defined in the first space of the invention above.

According to another aspect of this invention there is provided a vehicle, including:
a vehicle body having a front end and a rear end mounted on ground engaging formations that permit the vehicle body to travel across a surface, the vehicle including at least one brake for stopping the vehicle; and
an accident prevention system as defined in either of the preceding aspects of the invention.

The accident prevention system may include any one or more of the optional or preferred features of the accident prevention system defined in any one of the previous aspects of the invention. For example the system may include a sensor arrangement as described in the preceding aspect of the invention, a controller as defined in the preceding aspect of the invention and a brake applicator as defined in a preceding aspect of the invention. It may also include an alarm as defined in the preceding aspect of the invention.

According to another aspect of this invention there is provided a method for preventing a reversing accident where a vehicle that is reversing a low speed collides with a person in its path of travel, the method including:
sensing an object rearward of a rear end of the vehicle and generating an object recognition signal when an object is sensed that meets a certain condition; and
generating an accident prevention response signal on receiving an object recognition signal from the sensor arrangement, the accident prevention response signal response includes applying the brakes of the vehicle to either bring it to a halt if it is reversing or to stop it from reversing if it is stationary.

Sensing an object rearward of a rear end of the vehicle may include sensing IR heat from a mammal using a passive IR sensor.

Sensing an object rearward of a rear end of the vehicle may include transmitting a pulse of electromagnetic radiation away from the rear end of the vehicle and sensing for return pulses that return to the sensor arrangement.

Transmitting a pulse of electromagnetic radiation away from the rear end of the vehicle may comprise transmitting a sonar pulse, a radar pulse or a microwave pulse.

Said generating an accident prevention response signal may include issuing an alarm.

Issuing an alarm may comprise issuing an audio alarm and/or a visual alarm. Issuing an audio alarm may include issuing an audio alarm outside of the vehicle and/or inside of the vehicle.

According to yet another aspect of this invention there is provided a method for preventing an accident where a vehicle travelling at low speed collides with a person in its path of travel, the method including:

sensing an object that is at risk of being run over by a vehicle and generating an object recognition signal when an object is sensed that meets a certain condition; and generating an accident prevention response signal on receiving an object recognition signal from the sensor arrangement.

The method may include any one or more of the optional or preferred features defined in the preceding aspect of the invention.

DETAILED DESCRIPTION OF THE INVENTION

An accident prevention system for preventing low speed reversing accidents and a vehicle incorporating the system in accordance with this invention may manifest itself in a variety of forms. It will be convenient to hereinafter describe several example embodiments of the invention in detail with reference to the accompanying drawings. The purpose of providing this detailed description is to instruct persons having an interest in the subject matter of the invention how to carry the invention into practical effect. However it is to be clearly understood that the specific nature of this detailed description does not supersede the generality of the preceding broad description. In the drawings:

Figure 1:
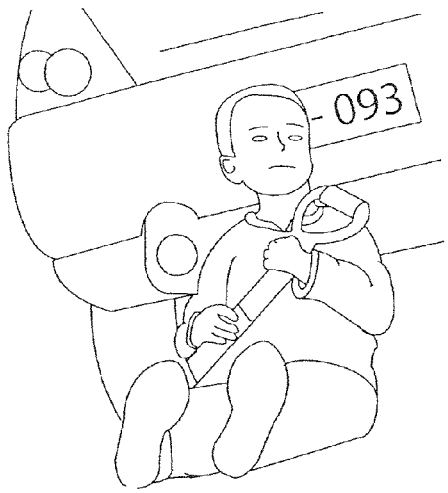
FIG. 1 is a perspective view of a small child seated on the ground behind a parked motor vehicle.
Figure 2:
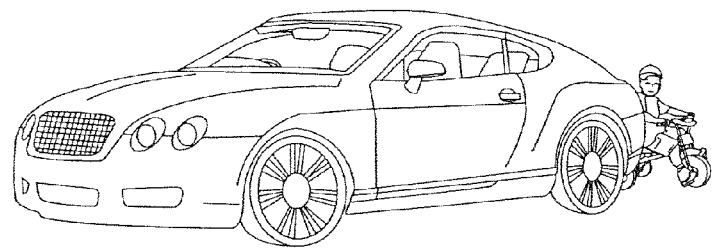
FIG. 2 is a perspective view of a child riding a tricycle behind a parked motor vehicle.
Figure 3:
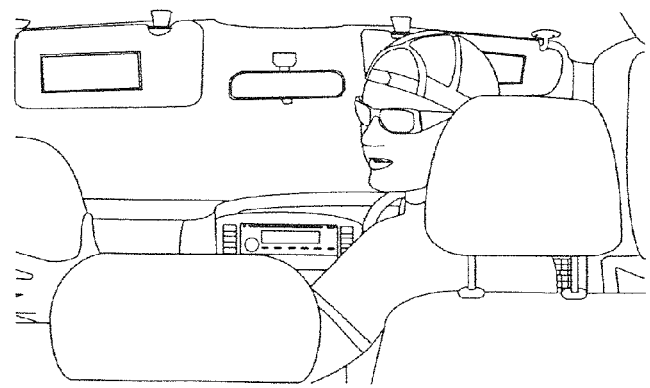
FIG. 3 is a perspective view of a driver reversing a motor vehicle showing their neck rotated so that their face looks out of the rear of the motor vehicle.

FIGS. 1 to 3 have been discussed in the background to the invention section above. They will not be discussed any further in this detailed description of the invention.

FIGS. 4A to 11 are schematic illustrations of one embodiment of an accident prevention system in accordance with one embodiment of the invention in use mounted on a vehicle. In these drawings the accident prevention system is referred to by the reference numeral 10 and a motor vehicle fitted with the system is referred to generally by the reference numeral 12.

Figure 4A:
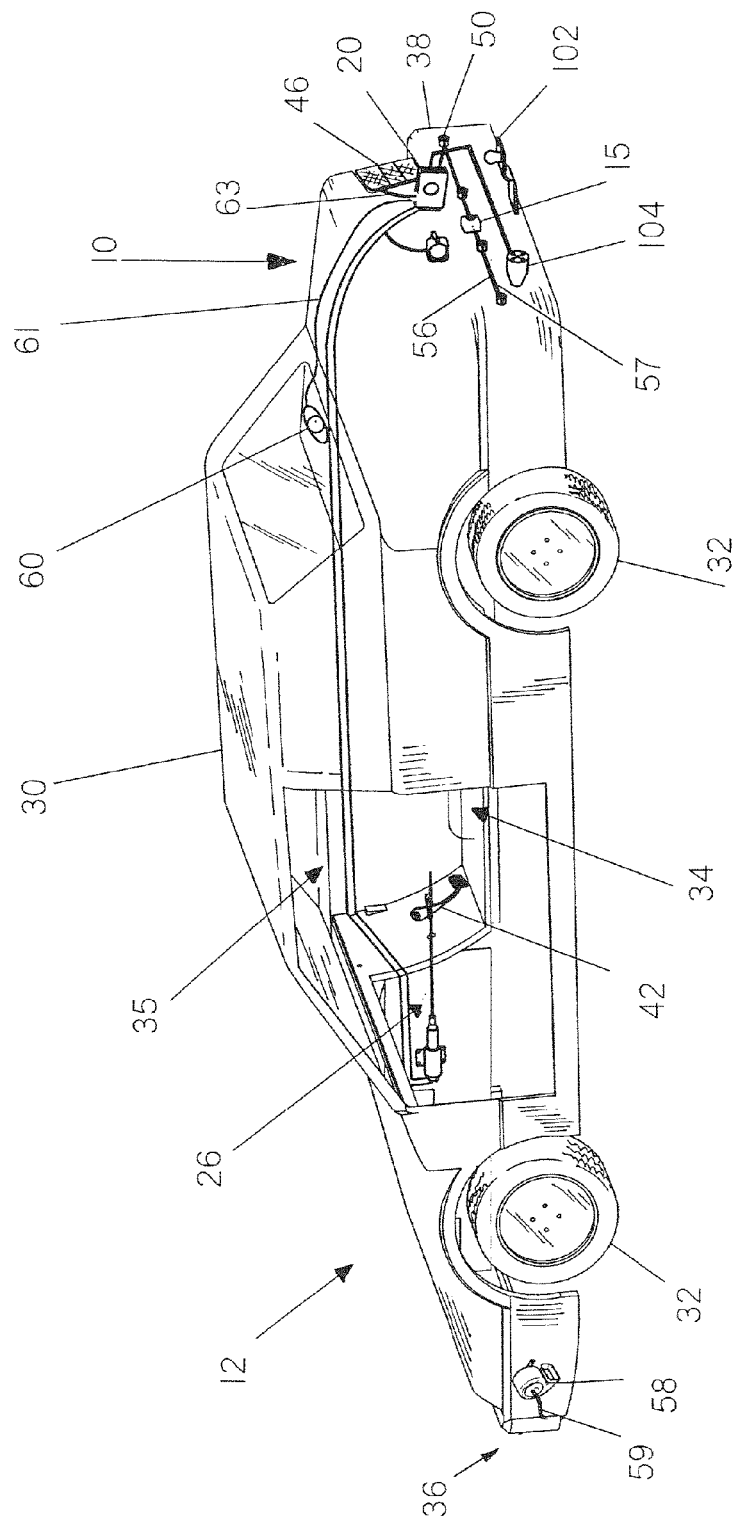
FIG. 4A is a schematic side perspective view of a vehicle fitted with an accident prevention system in accordance with one embodiment of the invention and FIG. 4B is a close up of part of the vehicle shown in FIG. 4A with some structural details omitted for clarity.
Figure 4B:
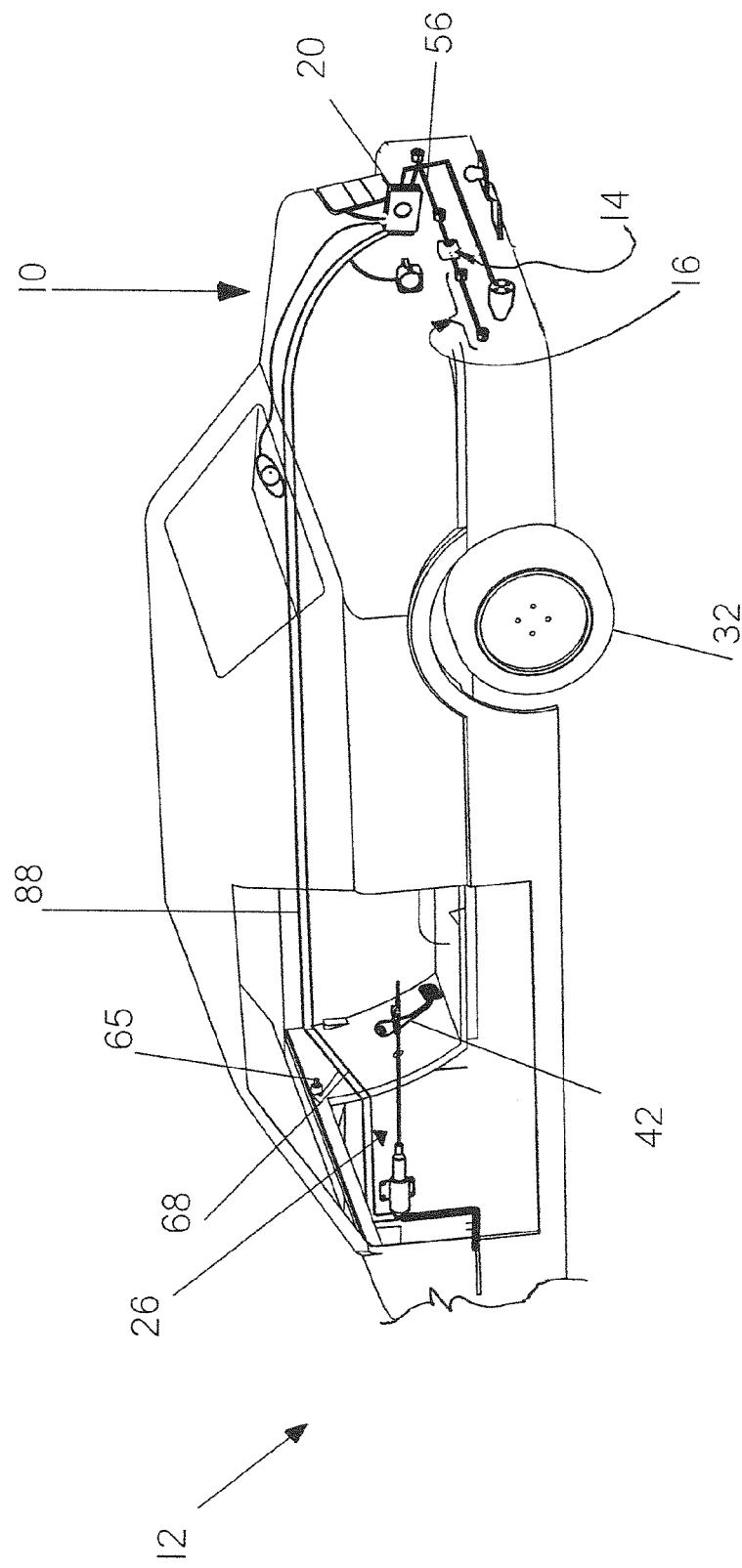

The system 10 as shown in FIGS. 4A and 4B includes an IR sensor arrangement that is indicated generally in some of the drawings by numeral 14 that is arranged to sense IR heat from a mammal in an IR sensing zone behind the motor vehicle 12 and to generate a mammal recognition signal when it senses a mammal in the IR sensing zone. The system 10 also includes a sonar sensor arrangement that is indicated generally in some of the drawings by numeral 16 that is arranged to sense sonar waves bouncing off an object in an object sensing zone and generating an object recognition signal. The system 10 includes a controller 20 that is operatively connected to the IR sensing arrangement 14 and the sonar sensor arrangement 16 that generates an accident prevention response on receiving a mammal recognition signal or an object sensing signal from the IR sensor or sonar sensor arrangements 14 or 16 respectively. Yet further the system 10 also includes an alarm that is operatively connected to the controller 20 and which is activated when the controller 20 issues an accident prevention response. The system 10 also includes a brake applicator 26 that is operatively connected to a brake of the motor vehicle 12 so that it applies the brakes of the vehicle 12 when it is activated. The brake applicator 26 is also operatively connected to the controller 20 such that the brake applicator 26 is activated when the controller 20 generates an accident prevention response. Each of the components of the system is described in more detail in turn below.

Figure 5:
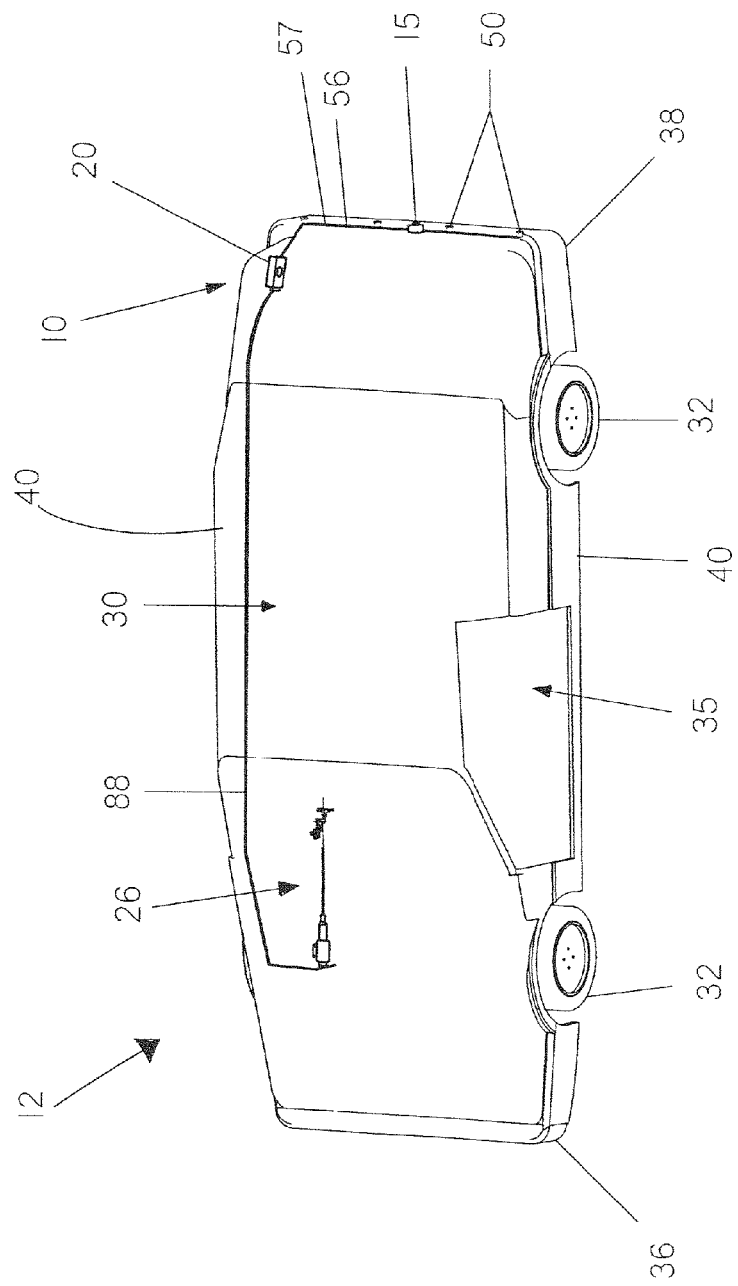
FIG. 5 is a schematic plan view of the accident prevention system of FIG. 4A.
Figure 12:
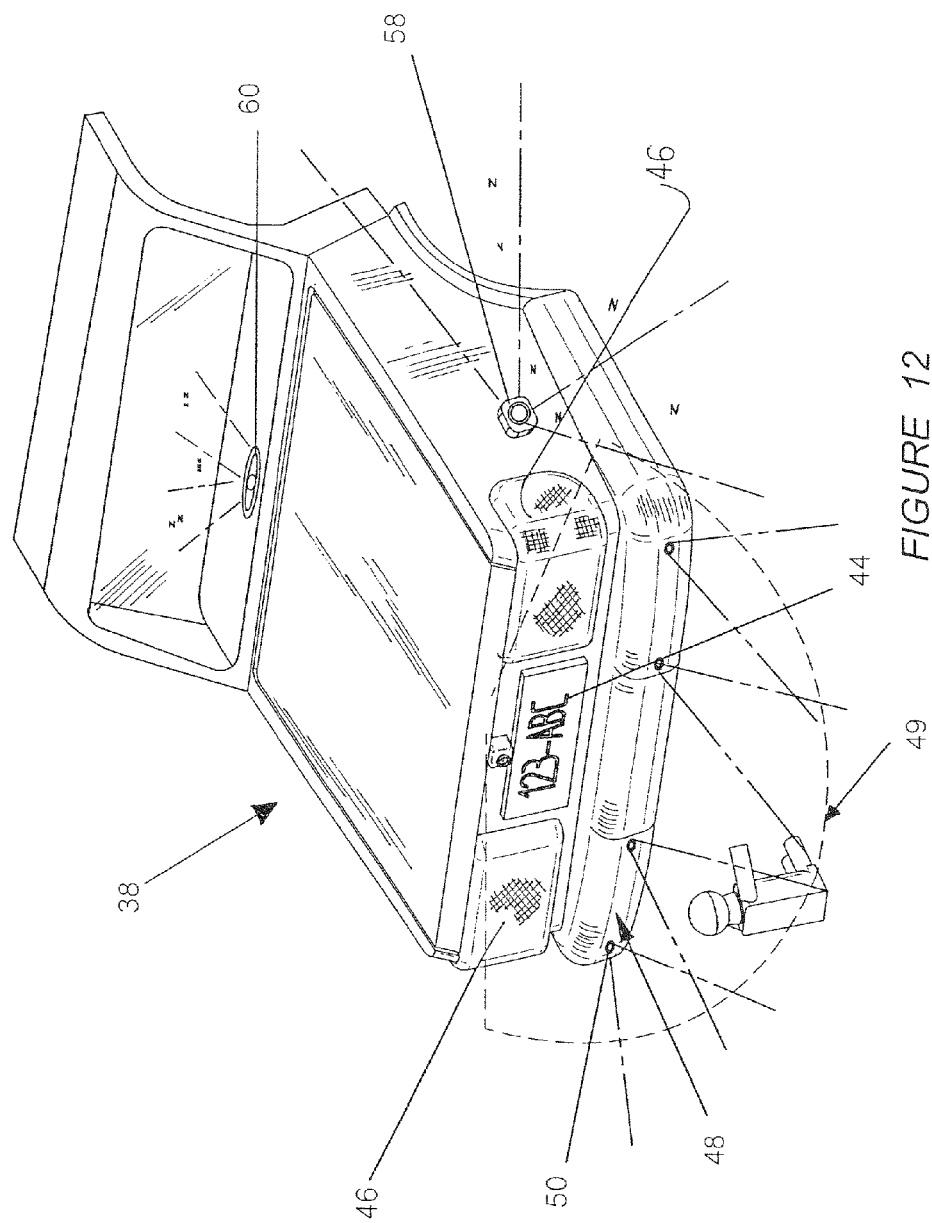
FIG. 12 is a schematic perspective view showing the vehicle of FIG. 4A fitted with the accident prevention system when the vehicle is in use reversing along a driveway when a small child is in the path of the vehicle.

The vehicle 12 comprises a vehicle body 30 that is mounted on wheels 32. The vehicle is a road going vehicle such as a motor car with an engine received within an engine compartment, a driver's seat 34 within an internal cabin 35 and a trunk or boot. The vehicle 12 is operated or driven by a driver seated on the driver's seat 34. As shown in FIG. 5 the vehicle body 30 has a front end 36 and a rear end 38 and two sides 40 extending between the front and rear ends 36 and 38. The vehicle 12 includes a set of driver's controls that include a foot brake 42 that can be applied by a driver to activate the operating brakes (as distinct from the park brake) of the vehicle 12 to slow down or stop the vehicle 12 while it is being driven on the road. Further as shown in FIG. 12 the rear end 38 has a vehicle registration plate 44 and two laterally spaced tail lights 46. The rear end also includes a bumper 48 extending transversely across the rear end 38 of the vehicle 12 at a height of about 0.3 m to 1.5 m, in particular 0.5 m to 0.9 m, above the travel surface on which the vehicle 12 is mounted.

In the embodiment illustrated in FIG. 12, the IR sensor arrangement 14 comprises a single passive thermal IR sensor 15 that is engineered to sense and identify the thermal signature of IR heat generated by a warm blooded mammal such as a human or animal having a body temperature in the region of 36 to 38 degrees Celsius. The sensor 15 is contained within a small compact sensor housing that is centrally mounted on the rear end 38 of the motor vehicle 12. While the illustrated sensor 15 is mounted adjacent the registration plate 44, e.g. above the numbers and/or letters on the registration plate 44, it should be understood that the sensor 15 can be mounted anywhere on the rear end 38. The sensor 15 is arranged so it is directed downward while facing away from the rear end 38 of the vehicle 12 so it can sense a warm body in an IR sensor zone 49 that extends rearward from the vehicle 12. Applicant has found that it is desirable to direct the IR sensor 14 downward towards the ground surface to avoid false activation of the system 10 due to the detection of other people in the environment. The IR sensor zone 49 basically extends for a limited length in a direction away from the vehicle 12 along a travel path taken by a vehicle when it reverses in a rearward direction. The passive IR sensor 15 can recognise the thermal signature of a mammal that is based on the specific internal body temperature of a mammal. Passive IR sensors are widely used on outdoor light systems to switch on the light when the person is sensed where they are sometimes called 'heat sensors'. As the structure and function of heat sensors would be known to persons skilled in the art and the structure and function does not form part of the invention it will not be described further in this specification.

The sonar sensor arrangement 16 comprises a plurality of sonar sensors 50 that are mounted on the rear end 38 of the vehicle 12 spaced apart from each other. In the illustrated embodiment they are mounted on the bumper 48 spaced apart from each other along the bumper 48. The sonar sensors 50 are capable of sensing both animate and inanimate objects within an object sensing zone 49 shown in FIG. 12 without being able to discriminate between the two types of objects. They pulse sound waves and detect reflected sound waves that return to the sensor 50 and based on the time taken for the sound pulse to return to the vehicle 12 they can sense the distance that the object is away from the vehicle 12. Thus it augments the sensor capability of the IR-sensor which detects mammals such as people because it provides another sensor type to sense a child or animal and thereby increases the reliability of the system. It also helps to avoid collisions with inanimate objects such as structures. The functioning of the sonar sensors is indicated schematically in FIG. 12.

The system 10 is arranged so that the controller 20 issues an accident prevention signal when the sonar sensors 50 sense an object coming within a predetermined distance of about 1.5 m of the rear end of the vehicle 12. Thus the sonar sensors 50 effectively sense an object getting closer to the rear end 38 and the system 10 and in particular the controller 20 is engineered to generate an accident prevention signal and apply the brakes of the vehicle 12 when the object comes within the predetermined distance. Thus the sonar sensors 50 operate in a fundamentally different manner to the passive IR sensor 15 which senses warm blooded mammals such as animals and small children without having an ability to sense the distance that the object is away from the sensor 15. As the use of sonar sensors 50 is known as their structure and function would be known to a person skilled in the art they will not be described in further detail in this specification.

Figure 6:
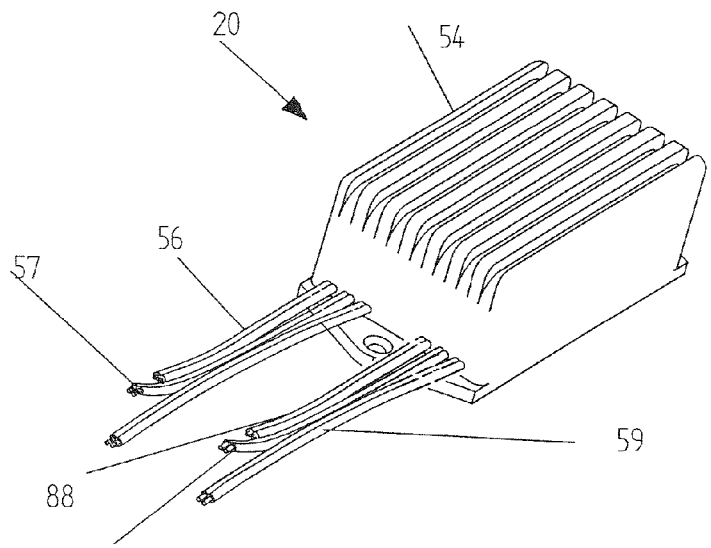
FIG. 6 is a three dimensional view of a controller forming part of the accident prevention system of FIG. 4A.

In the illustrated embodiment shown in FIG. 6 the controller 20 includes a processor such as a CPU that is contained within a compact control housing 54 that is mounted in an easily accessible position within the trunk or boot of the vehicle 12. Alternatively the control housing 54 could be mounted in the engine compartment. The controller 20 is operatively coupled to the IR sensor 15 by means of wiring 56 and receives and processes signals received from the passive IR-sensor 15. In particular when the controller 20 receives a mammal recognition signal from the sensor 15 it generates an accident prevention response which generates a number of different responses that are discussed below. Further the controller 20 is also operatively connected to the sonar sensors 50 by means of wiring 57, which also operatively connects the sonar sensors 50 to each other. In particular when the controller 20 receives an object recognition signal from one or more of the sensors 50 also generates an accident prevention response signal in relation thereto. The wiring 56 and 57 is shown in the drawing as a single line in the drawings because the two sets of wiring is received within a single wiring loom.

Figure 7:
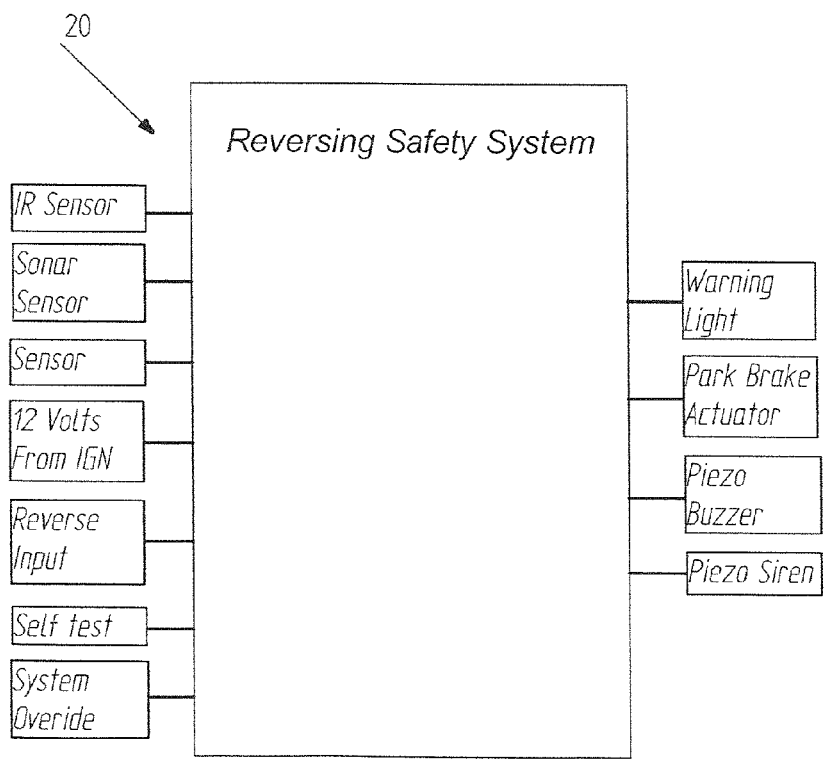
FIG. 7 is a schematic drawing showing inputs that can be entered into the controller and outputs that can be generated by the controller.

FIG. 7 illustrates schematically the inputs that can be entered into the controller 20 and the outputs that can be generated by the controller 20 during operation of the system 10. The main inputs shown in the drawing are the IR sensor, other sensor inputs such as the sonar sensor inputs, and the reverse input which arms the system 10 when the vehicle 12 engages reverse gear as described below. Other inputs include the 12 volt supply from the vehicle battery, a self-test feature that enables the system to be tested, and a system override. The main outputs from the controller 20 are the warning light, a brake actuator, an audio alarm that is a piezo siren and a piezo buzzer as shown in FIG. 7.

The system 10 has an arming arrangement shown generally by numeral 63 that causes the system 10 to be armed when the vehicle 12 engages reverse gear. In the embodiment illustrated in FIG. 4A, the arming arrangement of the system 10 is operatively coupled to an electrical circuit within the vehicle 12 that energises the reverse lights on the motor vehicle 12 and thereby arms automatically when the vehicle 12 engages reverse gear. As illustrated in FIG. 4, the system 10 also has an override switch indicated by numeral 65 that enables a driver to override the system 10 by activating the override switch 65. A driver can use this feature for example when they wish to reverse up close to a wall or post and the system 10 applies the brakes 42 of the vehicle 12 before the vehicle 12 can get close enough to a said post or wall. The override switch 65 is located in the cabin 35 of the vehicle 12 in a location at which it can be conveniently accessed by the driver. For example the override switch 65 might conveniently be mounted on the dashboard of the vehicle 12. The override switch 65 is operatively connected to the controller 20 by means of a wiring 68. This way activation of the override switch 65 sends an override signal to the controller 20 which in turn sends signals to the brake applicator 26 to release the brake 42 and signal to the alarm 22 to switch off the alarm 22.

The alarm arrangement can include more than one alarm device for example at different locations on the vehicle. The alarm arrangement includes a siren or horn 58 that is positioned outside of the cabin 35 towards the front end 36 of the motor vehicle 12. Conveniently the siren 58 sounds to the outside of the vehicle 12 so that it is clearly audible to outside persons including a person in the path of the reversing vehicle 12. The siren 58 is operatively coupled to the controller 20 by means of wiring 59 and when the controller 20 generates an accident prevention response it activates the siren 58 causing it to make a loud noise. The siren or horn 59 could be provided by the factory fitted horn or hooter of the vehicle 12.

Figure 8:
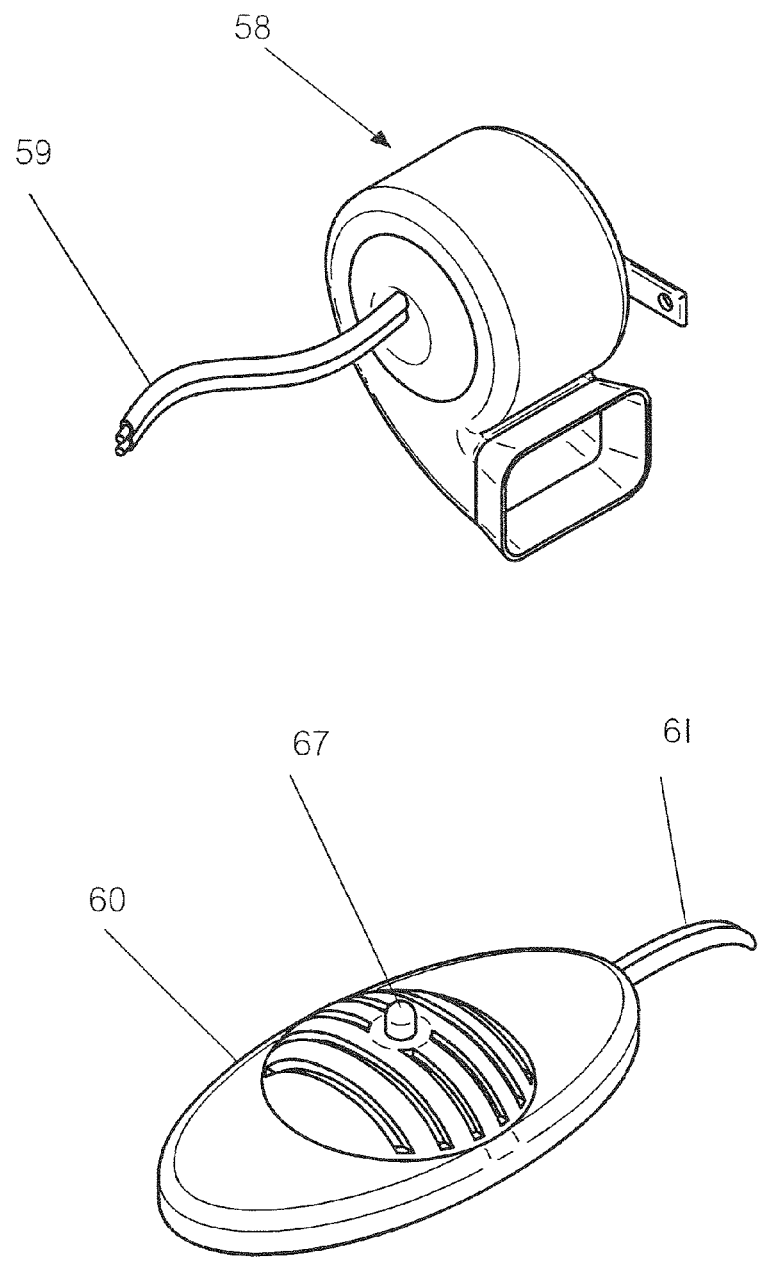
FIG. 8 is a three dimensional view of an audio alarm and a visual alarm for the accident prevention system of FIG. 4A that is mounted on a rear window of the vehicle inside the vehicle.
Figure 9:
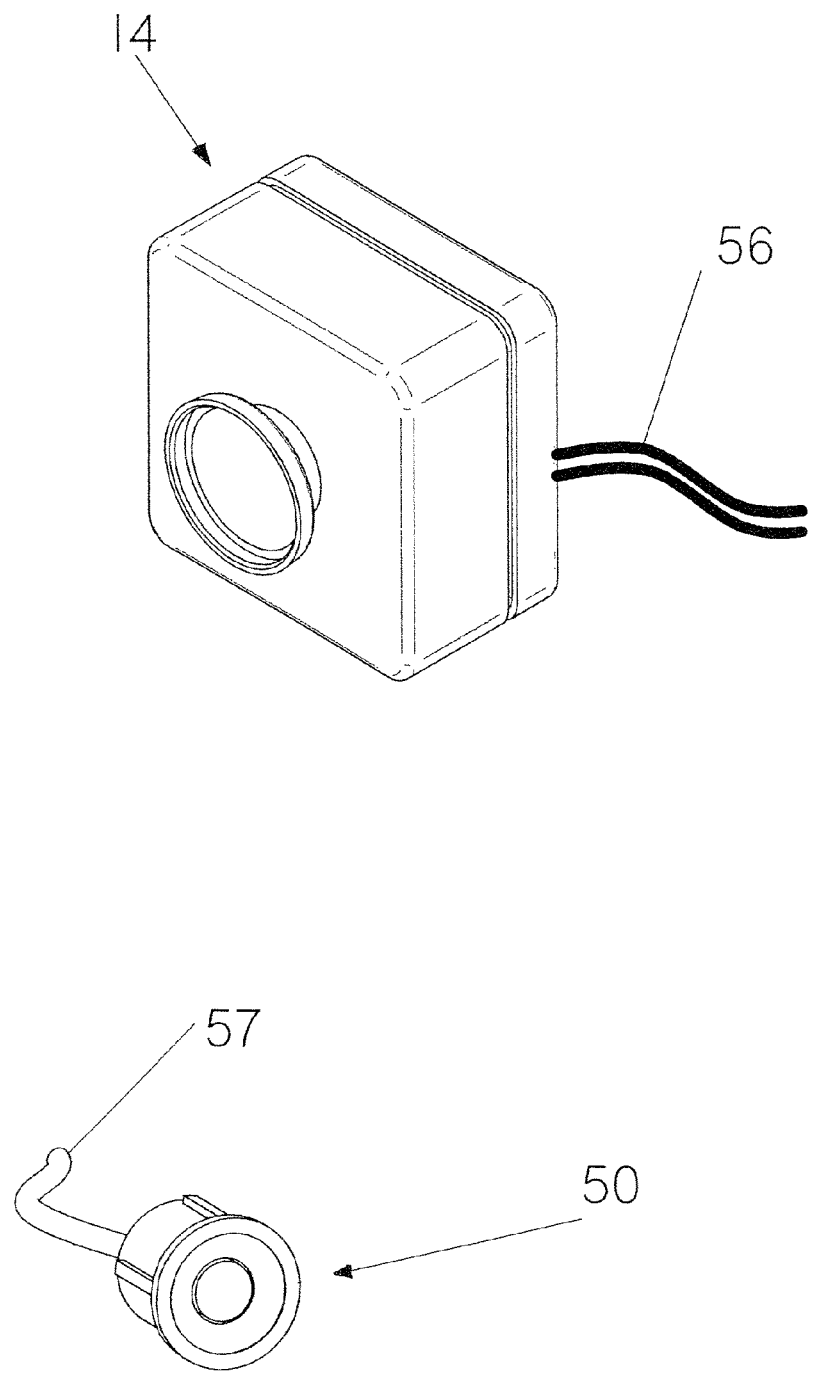
FIG. 9 is a three dimensional view of an infra-red sensor and a sonar sensor forming part of the IR and sonar sensor arrangements of the accident prevention system of FIG. 4A.

In the illustrated embodiment shown in FIG. 8 the alarm arrangement also includes a further alarm 60 that is mounted within the cabin 35 having a planar backing surface up against a rear window of the vehicle 12 as illustrated in FIG. 12. The further alarm 60 is a visual and audio alarm that is operatively connected to the controller 20 by means of wiring 61. When the controller 20 generates an accident prevention response signal it activates the alarm 60 in the rear window of the motor vehicle 12 as illustrated in FIG. 4A and causes a bright light 67 on the alarm 60 to flash. The alarm 60 including light 67 positioned in the rear window is visible to people inside and outside of the vehicle. Further the loud audio alarm positioned within the cabin 35 of the vehicle 12, in contrast to the alarm 58 which is positioned outside the cabin 35, alerts the driver of the vehicle 12 to the risk of an accident. The wiring 61 could also cause the factory fitted horn which can be fitted in the engine compartment to sound.

Figure 11:
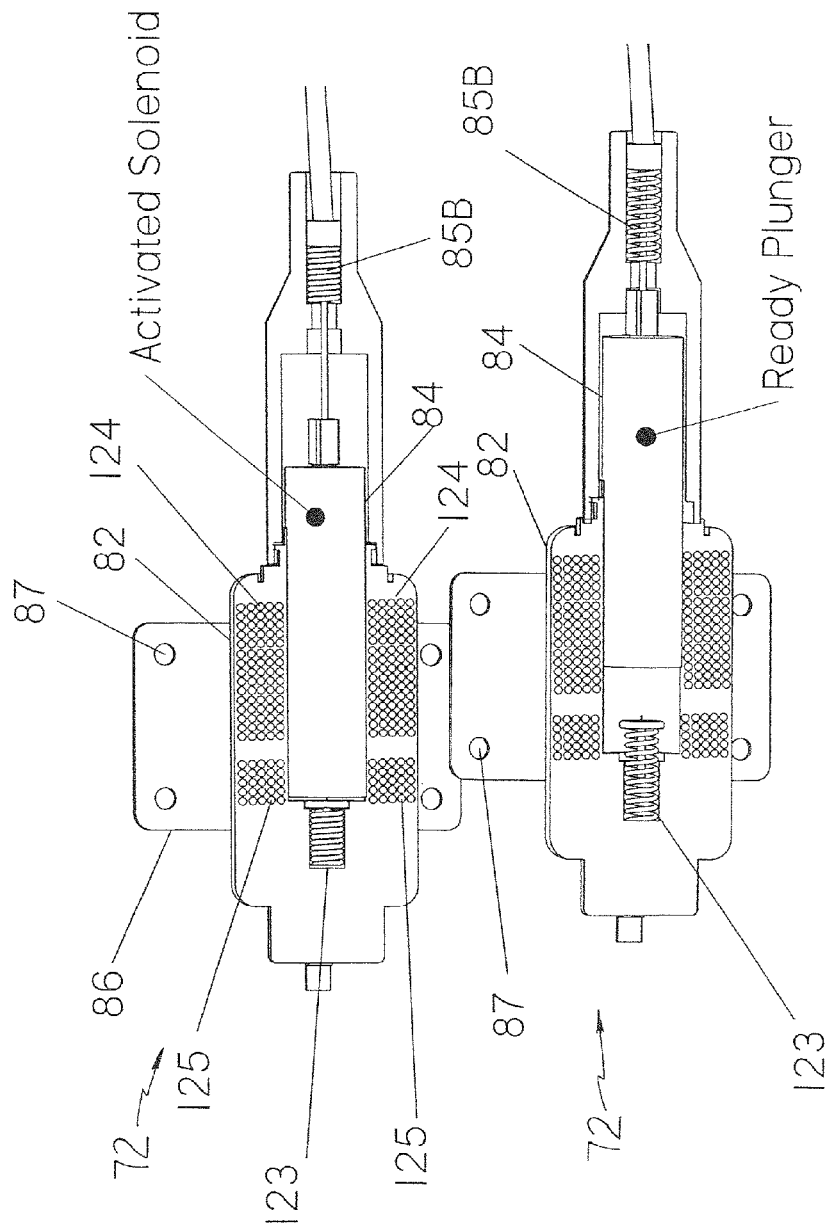
FIG. 11 is a sectional view through the electronic cylinder of the brake actuator of the accident prevention system of FIG. 4A showing it mounted to the brake pedal of the vehicle in a ready but not activated position and also in an activated position.

FIGS. 11 and 11 illustrate the brake applicator 26 for the system 10 which broadly includes a brake mounting member 70 and a solenoid 72 which is operatively connected to the brake mounting member 70.

The brake mounting member 70 automatically applies or presses the pedal of the brake 42 inside the cabin 35 causing the brakes to be swiftly and firmly applied. This stops the vehicle 12 if it is moving, or stops it from taking off if it has not yet started moving. The structure of the brake applicator 26 and its manner of operation is illustrated in some detail in FIGS. 10 and 11.

Figure 10:
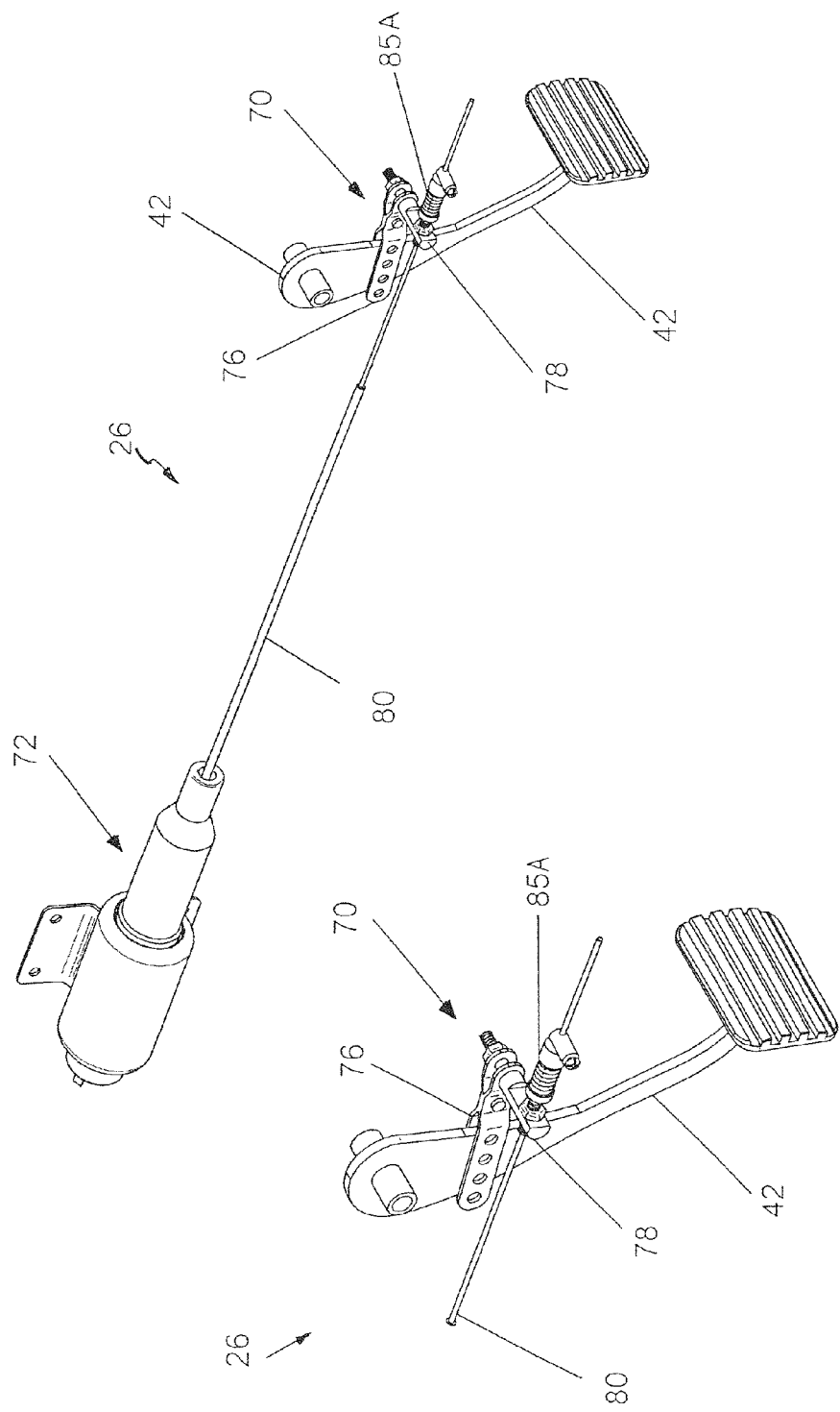
FIG. 10 is a perspective view of the brake actuator of the accident prevention system of FIG. 4A that is connected to the brake pedal of the vehicle.

The brake mounting member 70 comprises a brake pedal mounting formation in the form of a bracket 76 that can be fixed to the brake pedal 42 in the manner shown in FIG. 10, and a cable mounting formation 78 extending laterally away from the bracket 76. The applicator 26 also includes a cable 80 extending from the bracket 76 of the mounting element 76 to the solenoid 72. This way a movement of the cable 80 by the solenoid 72 acts to pull the brake pedal 42 towards the solenoid 72, i.e. in a forward direction, thereby applying the regular or operating brakes of the vehicle 12.

The solenoid 72 broadly comprises a solenoid housing 82 and an actuator 84 that is a plunger. The solenoid 72 is mounted on the vehicle 12 at a distance spaced from the foot brake by means of a mounting bracket 86. The bracket 86 in turn can be mounted on a wall of the body of the vehicle 12 by fastening elements such as screws which are passed through openings 87 in the bracket 86. When the controller 20 sends an accident prevention response signal to the solenoid 72, the coils of the solenoid 72 are energised by an electrical current and the solenoid actuator 84 is linearly displaced relative to the housing 82. The movement of the actuator 72 pulls the cable 80 which in turn pulls on the cable mounting formation 78 and thereby the bracket 76, to apply the brake 42 of the vehicle 12 and stop the vehicle 12. Conveniently the solenoid has a dual coil system in which a first coil 124 can draw a substantial current in order to generate the necessary force required to apply the brakes of the vehicle 12. By contrast the second coil 125 is a holding coil and requires far less current to hold the actuator plunger 84 in place against a rear of the housing 82. As the plunger 84 approaches the rear of the housing 82 it comes under the influence of and into contact with a holding coil switch 123. This switches off the first coil 124 and turns on the second coil 125. In view of the high current throughput that is required to apply the brake a high level of use of this coil 124 is unsustainable and would lead the coil 124 to fail. Therefore it is very important for the actuator plunger 84 to make contact with the holding switch 123 to ensure that the solenoid 72 goes into holding mode. This holds the brake 42 in the applied position until the solenoid 72 receives a signal from the controller 20 to release the brakes 42. The brake applicator 26 also includes a feature that causes the solenoid 72 to close properly each time it is activated even if the travel of the brake pedal 42, when it is applied, is insufficient to displace the actuator 84 fully to a rear end of the solenoid housing 82 where it can make good contact with the holding coil switch 123.

The cable 80 is engineered so that it has some resilience and can thereby be extended further than the travel of the brake pedal 42 to effect good contact of the actuator 84 with the holding coil switch 123 inside the solenoid housing 82. In particular this resilience can be accomplished by providing a spring 85A in the cable 80 that yields and thereby extends the cable 80 at a higher tensile force than that required to depress the brake pedal 42. This way when the solenoid 72 is activated the brake pedal 42 yields first and applies the brake 42. Thereafter if further travel is required for the actuator 84 to make effective contact with the holding coil switch 123 inside the housing 82, the spring 85B yields to enable the actuator 84 to travel the full distance to the holding coil switch 123. As travel of brake pedal 42 can vary over a period of time while the vehicle 12 is in general use, this feature is very useful in accommodating wear in the brakes of a vehicle over time. It also provides some tolerance when the system 10 is initially installed and has the result that the system can accommodate less than perfect installation.

The operation of the brake applicator 26 is controlled by the controller 20 independently of the driver of the vehicle 12 and it takes place automatically and without any driver intervention. In particular when the controller 20 generates an accident prevention response signal this is communicated to the brake applicator 26 which is activated and immediately applies the brakes. It will be appreciated that the brake applicator 26 does not interfere in any way with the factory installed brake system of a commercial vehicle. This is very important as a manufacturer's warranty would be voided by any interference with the working mechanisms of a vehicle's brake. The brake applicator 26 described above does not interfere in any way with the normal operation of the brake. It merely provides an additional way of applying the brakes of the vehicle 12 that is independent of driver operation. The system 10 also includes control wiring 88 extending from the controller 20 to the brake applicator 26 as is shown in the drawings for enabling the controller to send an accident prevention response signal to the applicator 26.

The description above and the drawing show the sensors 15, 50 hard wired to the controller 20. They also show the controller 20 hard wired to the alarms and the brake applicator. Instead the sensors, alarms and brake applicator could be wirelessly coupled to the controller 20 by means of any wireless communication means including radio and fibre optic.

In use as shown in FIG. 12 a typical scenario where the system 10 might be used is where a vehicle is parked in a driveway and has to reverse the vehicle along the driveway to get onto a road. The system 10 is armed when the driver of the motor vehicle 12 engages reverse gear and thus use of the system commences at this point. Once the system 10 is armed the IR sensor 15 can sense passive IR and generate a mammal recognition signal and the sonar sensors 50 can sense objects using sound waves and generate an object recognition signal. When either of these signals is generated it is sent to the controller 20 which generates an accident prevention response signal. The signal is generated by whichever of the IR sensor 15 and the sonar sensors 50 first identify a mammal or an object respectively. If the IR sensor 15 does not recognise a mammal in the vehicle's path the sonar sensors can still recognise the object independently of the IR sensor and send the appropriate signal to the controller to trigger the accident prevention response signal.

The accident prevention response signal is sent to the horn 58 and alarm 60 which are activated, and also to the brake applicator 26 which acts to immediately apply the brakes of the vehicle independently of the driver. This stops the vehicle 12 if it is moving, or gets it to remain stationary, if it was not already moving as the case may be. It is to be noted that the system does not rely on the driver of the vehicle seeing the child or applying the brake. Instead it relies on an automatic braking action and on automatic generation of an alarm which can warn not only the driver but other people outside of the vehicle 12 of the danger as well. Thus the system 10 is not solely dependent on the IR sensor 15 or on the sonar sensors 50. It relies on the object being sensed by at least one of these types of sensors and this significantly enhances the reliability of the system 10.

Figure 13:
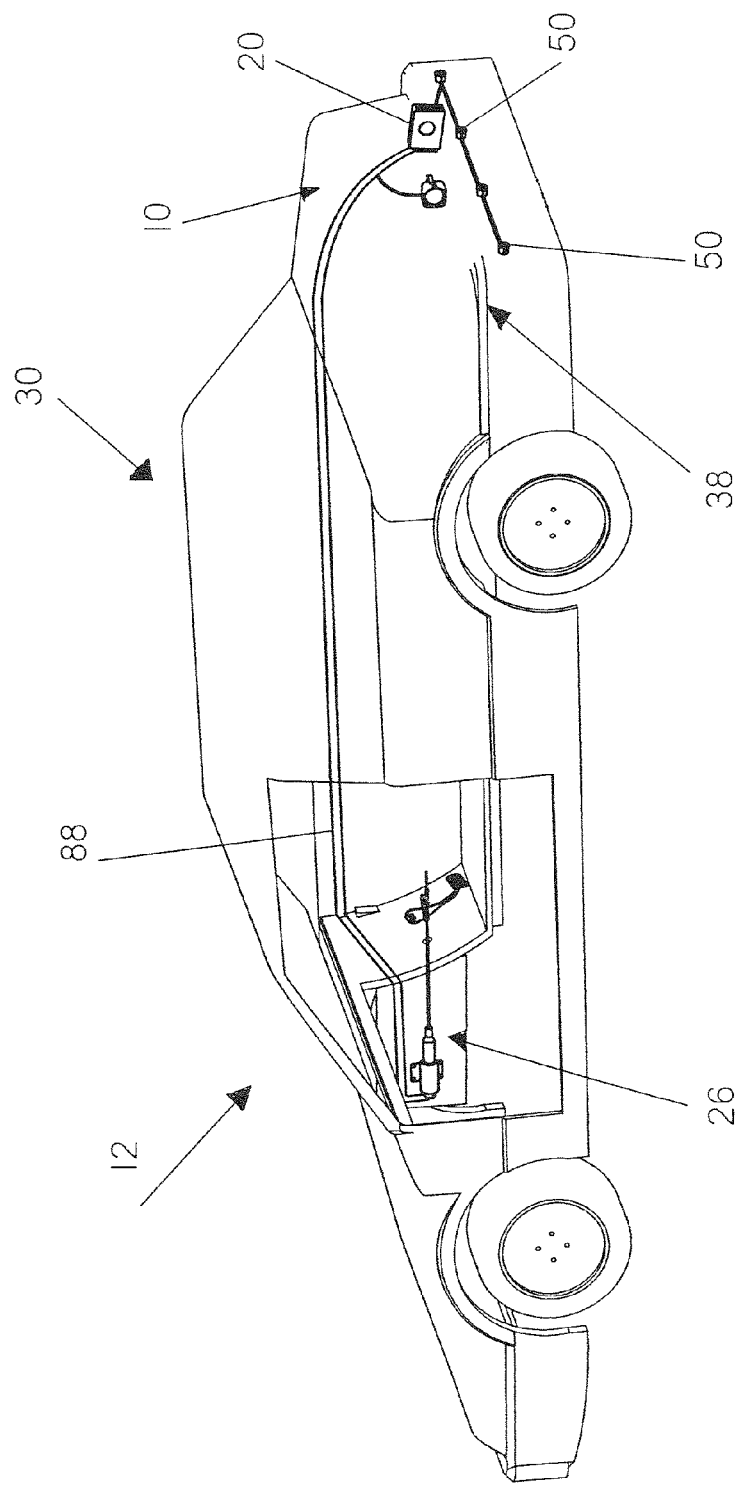
FIG. 13 is a schematic side perspective view of a vehicle fitted with an accident prevention system in accordance with another embodiment of the invention.

FIG. 13 illustrates an accident prevention system in accordance with another embodiment of the invention. As this system has many similarities to the system described above with reference to FIGS. 4 to 11, the same reference numerals will be used to refer to the same components unless otherwise indicated. Further the following description will focus solely on the differences between this embodiment and the earlier embodiment.

The FIG. 13 embodiment has a sonar sensor arrangement 16 comprising a plurality of sonar sensors 50 spaced apart long the rear end 38 of the vehicle body 30 but it does not have an IR sensor arrangement. The sonar sensors 50 can generate an object recognition signal and send it to the controller 20 and the controller 20 can generate an accident prevention response signal in response thereto. The system 10 does not have an IR sensor and cannot sense passive IR or body heat of a mammal. Thus the system 10 relies solely on the sonar sensors 50 to sense an object in the path of vehicle and report it to the controller 20 which therefore will respond in the same way as described above and apply the brakes and the alarms without the intervention of the driver.

In a variation of the FIG. 13 embodiment the sensor arrangement is a radar sensor arrangement which pulses out radio waves and senses when they return to the sensor. The time taken for a pulse to return enables the distance of the sensed object from the sensor to be determined in the same way that this is done with sonar sensors. The radar sensors look the same as the sonar sensors shown in FIG. 13. Otherwise this system works in the same way as the system described immediately using sonar sensors. In another variation of the FIG. 13 embodiment the sensor arrangement is a microwave sensor arrangement which pulses out microwaves and senses when they return to the sensor. The time taken for a pulse to return enables the distance of the sensed object from the sensor to be determined in the same way that this is done with sonar sensors. Otherwise this system works in the same way as the system described immediately using sonar sensors.

Figure 14:
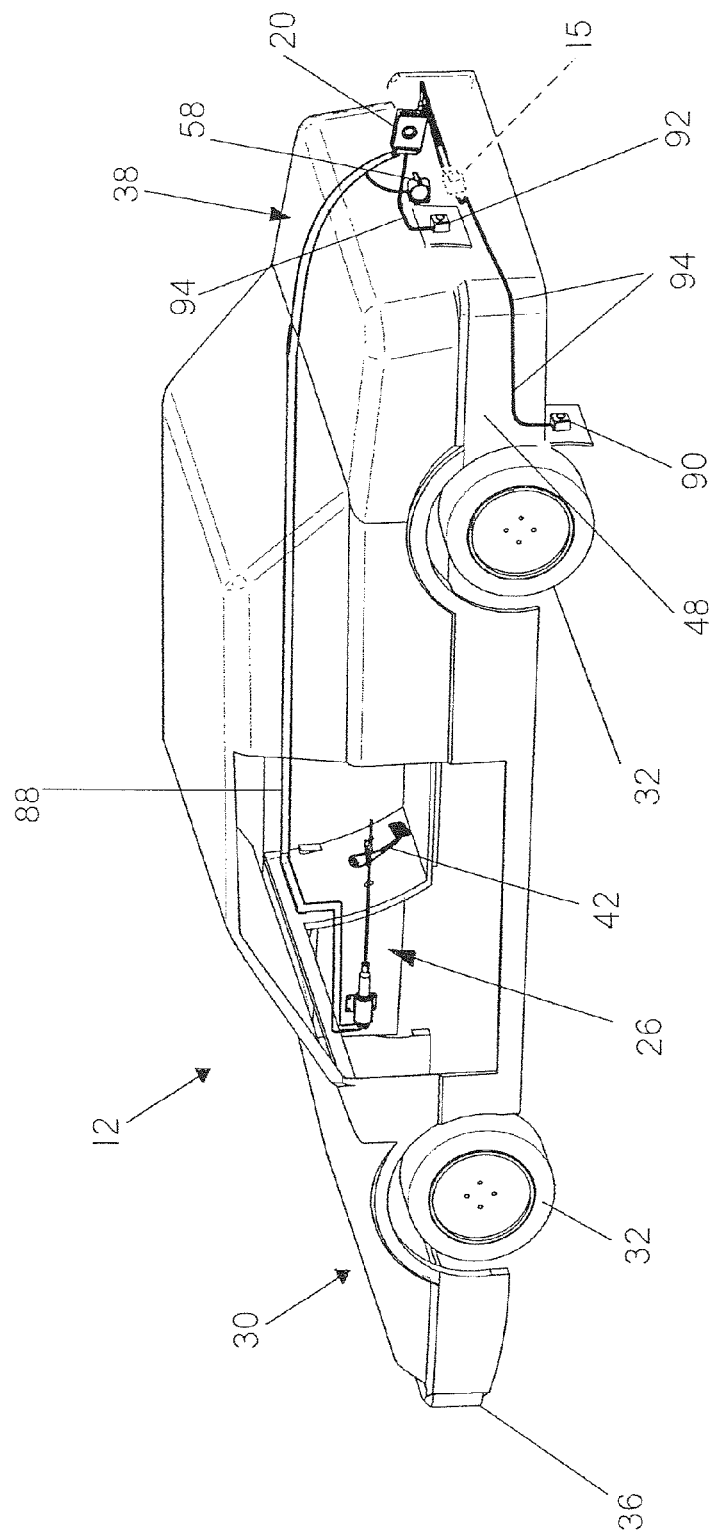
FIG. 14 is a schematic side perspective view of a vehicle fitted with an accident prevention system in accordance with yet another embodiment of the invention.

FIG. 14 illustrates an accident prevention system in accordance with another embodiment of the invention. As this system has many similarities to the system described above with reference to FIGS. 4 to 11, the same reference numerals will be used to refer to the same components unless otherwise indicated. Further the following description will focus solely on the differences between this embodiment and the earlier embodiment.

The embodiment in FIG. 14 comprises an IR sensor arrangement 14 that comprises two laterally spaced IR sensors 90, 92 that are mounted towards the rear end 38 of the vehicle body 12. As shown in the drawings the IR sensors 90, 92 are mounted on the mud flaps of the rear wheels 32 of the vehicle 12 and face in a rearward direction. The sensors 90, 92 are positioned close to the ground and also face at an angle down towards the ground. The system also includes a controller 20 which is operatively coupled to the IR sensors 90, 92 by wiring 93 mounted in the trunk adjacent the rear end 38 of the vehicle 12. The controller 20 in turn is operatively connected to an alarm 58 and to the brake applicator 26 as described above.

As a result when the when the IR sensor arrangement 14 senses the thermal signature of a mammal in an IR sensing zone behind the vehicle 12 it sends a mammal recognition signal to the controller 20. In response to receiving this signal the controller 20 generates an accident prevention response signal that is sent to the brake applicator 26 and applies the brakes and causes the siren 58 to sound. In a variation of this embodiment the IR sensor arrangement includes a single centrally mounted IR sensor 14 which is shown in dotted lines on the rear end of the vehicle 12.

Figure 15:
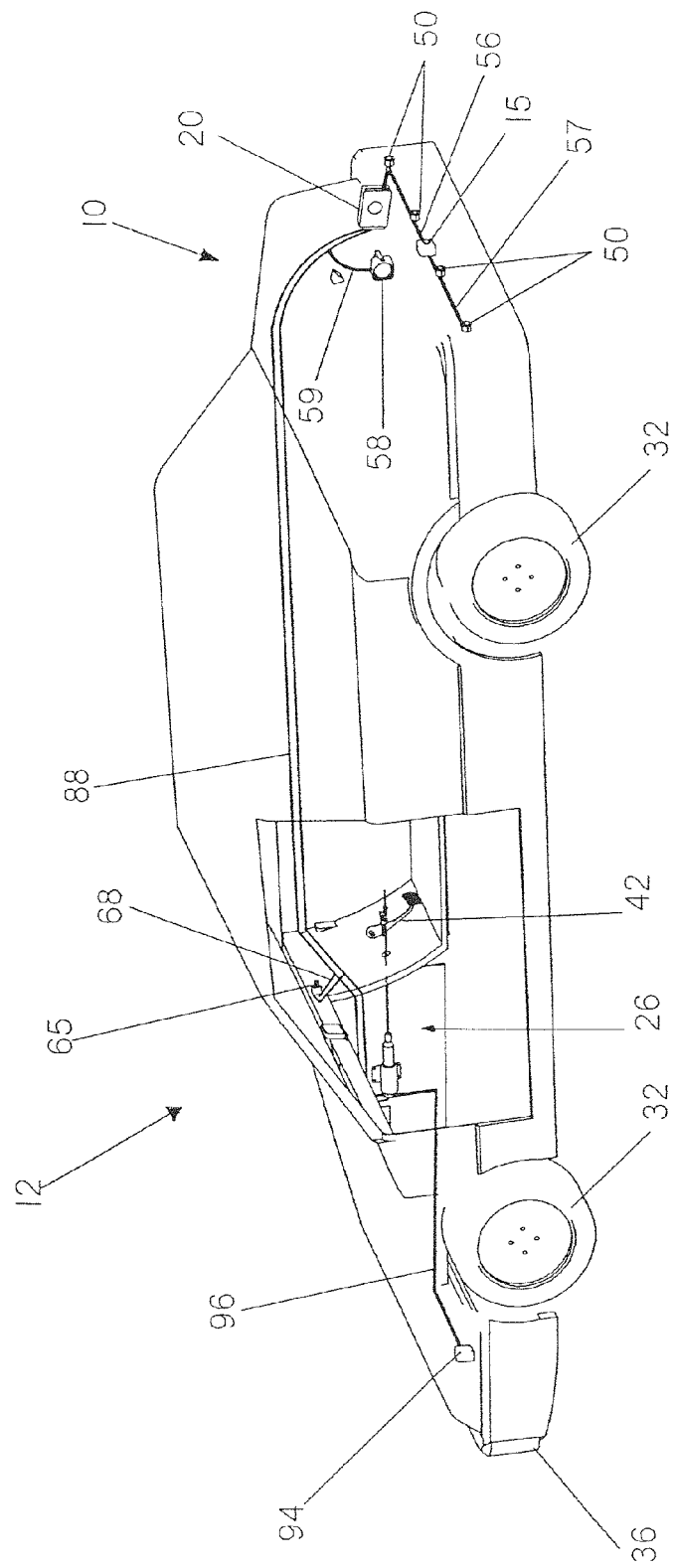
FIG. 15 is a schematic side perspective view of a vehicle fitted with an accident prevention system in accordance with yet another embodiment of the invention.
Figure 16:
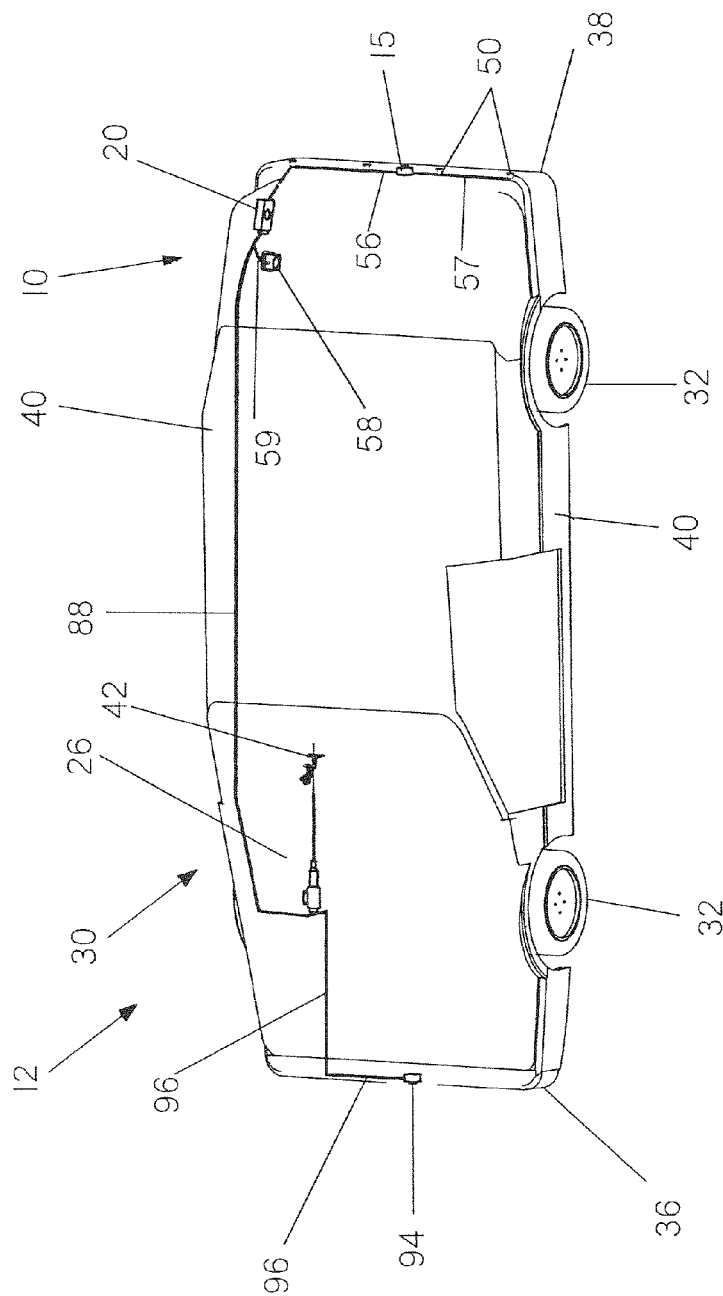
FIG. 16 is a schematic top perspective view of the vehicle fitted with the accident prevention system in FIG. 15.

FIGS. 15 and 16 illustrate an accident prevention system in accordance with another embodiment of the invention. As this system has many similarities to the system described above with reference to FIGS. 4 to 11, the same reference numerals will be used to refer to the same components unless otherwise indicated. Further the following description will focus solely on the differences between this embodiment and the earlier embodiment.

The system contains all the features of the system in FIG. 4. The IR sensors 15 and the sonar sensors 50 on the rear end 38 of the vehicle 12 work in the same way as described above with reference to FIG. 4. Further the accident prevention responses taken by the system 10 are the same as those described above with reference to FIG. 4.

In addition the system has a further IR sensor arrangement comprising a single IR sensor 94 mounted on the front end 36 of the vehicle 12 that can sense a mammal in an IR sensing zone in front of the vehicle. The sensor 94 is operatively connected to the controller 20 by means of wiring 96. The controller 20 is programmed so that the sensor 94 is armed when the driver of the vehicle 12 engages forward gear and the vehicle 12 travels at a speed of 0-5 kph. Once the speed of the vehicle increases above 5 kph, the sensor 94 is disarmed. This system 10 therefore is able to sense a mammal that is positioned in front of the vehicle 12 particularly towards the sides thereof, when the vehicle is travelling slowly in a forward direction. The inventor has identified this as a blind spot where it is difficult for a driver to see a small child.

Figure 17:
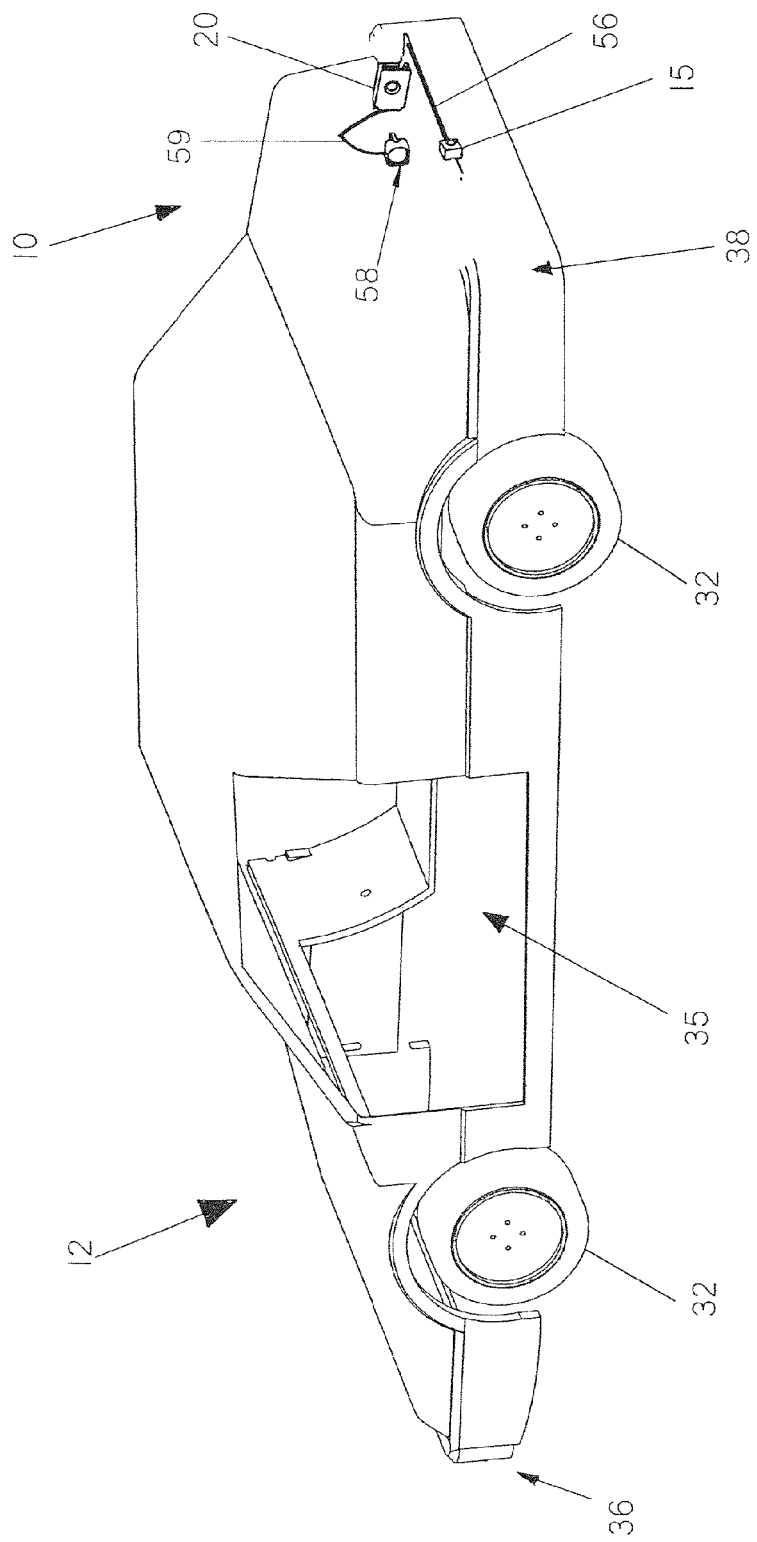
FIG. 17 is a schematic side perspective view of a vehicle fitted with an accident prevention system in accordance with yet another embodiment of the invention.

FIG. 17 illustrates an accident prevention system in accordance with another embodiment of the invention. As this system has many similarities to the system described above with reference to FIGS. 4 to 11, the same reference numerals will be used to refer to the same components unless otherwise indicated. Further the following description will focus solely on the differences between this embodiment and the earlier embodiment.

The system 10 in FIG. 17 includes an IR sensor arrangement 14 and a controller 20 which in turn is operatively connected to a sound alarm that is a siren 58 by means of wiring 59. While a sensor arrangement having a single IR sensor that is centrally mounted has been shown, a sensor arrangement comprising two laterally spaced IR sensors like those shown in FIG. 14 could equally be used. This system can detect a presence of a mammal in a sensing zone and generate mammal recognition signal which is sent to the controller 20. On receiving this signal the controller 20 generates an accident prevention response signal which causes the alarm to sound. This warns bystanders and the driver of the risk of an accident so that they and particularly the driver can take action to avoid an accident. However it does not have any sonar sensors for sensing an object behind the vehicle and it does not have the capability of being able to automatically apply the brakes of the vehicle when the controller generates an accident prevention response signal.

Figure 18:
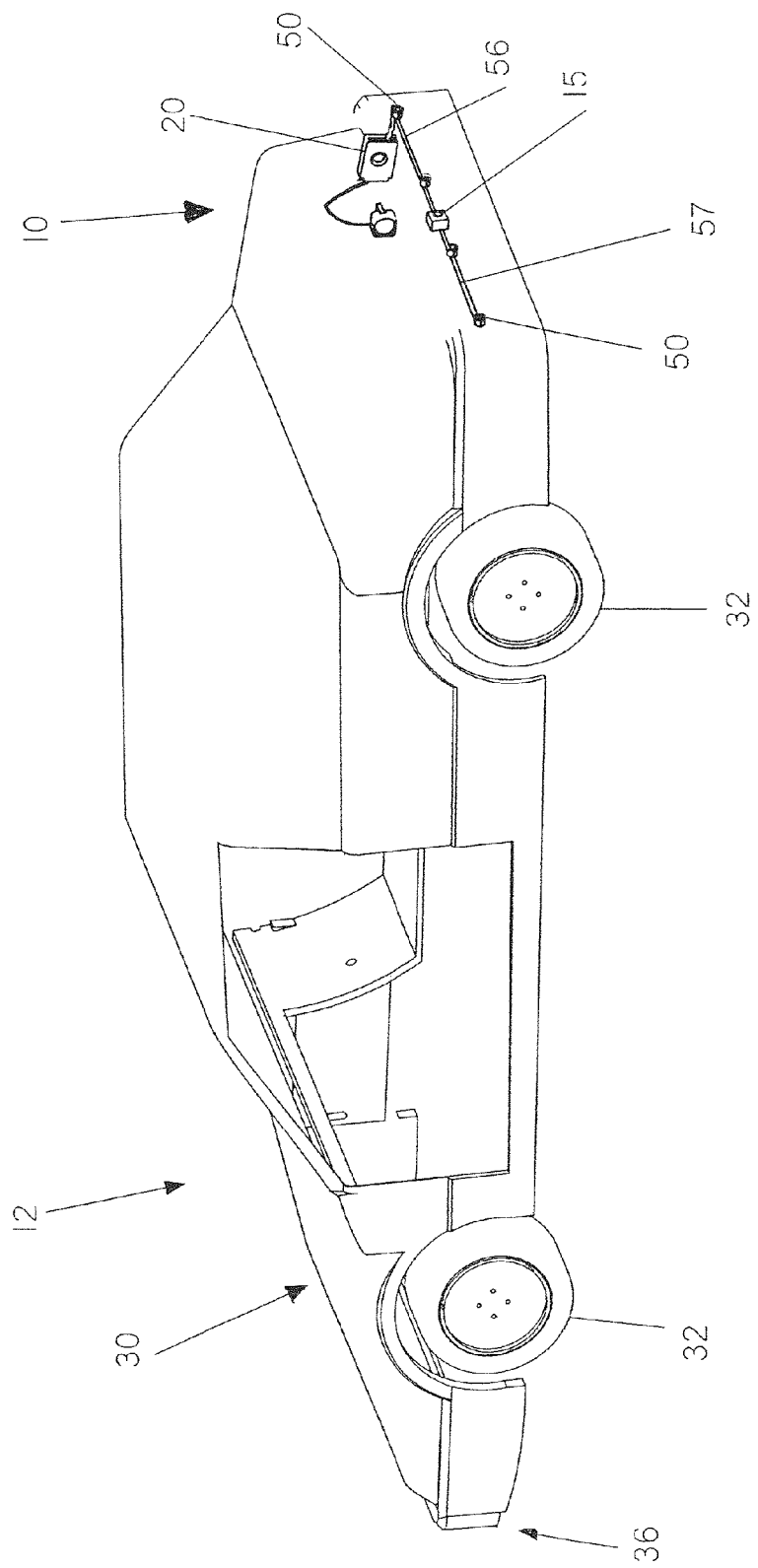
FIG. 18 is a schematic side perspective view of a vehicle fitted with an accident prevention system in accordance with yet another embodiment of the invention.

FIG. 18 illustrates an accident prevention system in accordance with another embodiment of the invention. As this system has many similarities to the system described above with reference to FIGS. 4 to 11, the same reference numerals will be used to refer to the same components unless otherwise indicated. Further the following description will focus solely on the differences between this embodiment and the earlier embodiment.

The system in FIG. 18 has an IR sensor arrangement much like the FIG. 17 embodiment. It also has a controller 20 like the FIG. 17 embodiment and an audio alarm that is a horn 58 like the FIG. 17 embodiment. The main difference between the FIG. 18 and FIG. 17 embodiments is that the system in FIG. 18 has a sonar sensor arrangement 16 in addition to the IR sensor arrangement 14. The sonar sensor arrangement 16 comprises individual sonar sensors 50 and is operatively connected to the controller 20 in parallel with the IR sensor arrangement 14 and generates an object recognition signal when it senses an object within a sensing zone. When this occurs an object recognition signal is sent to the controller 20 which generates an accident prevention response causing the alarm 58 to sound which warns the driver and other people of a risk of a collision. Thus FIGS. 17 and 18 illustrate more basic embodiments of the invention that are able to sense a mammal such as a child in the IR sensing zone which is in the path of a reversing vehicle and then cause a siren to sound to warn people in the vicinity of the vehicle and also the driver of the vehicle.

Figure 19:
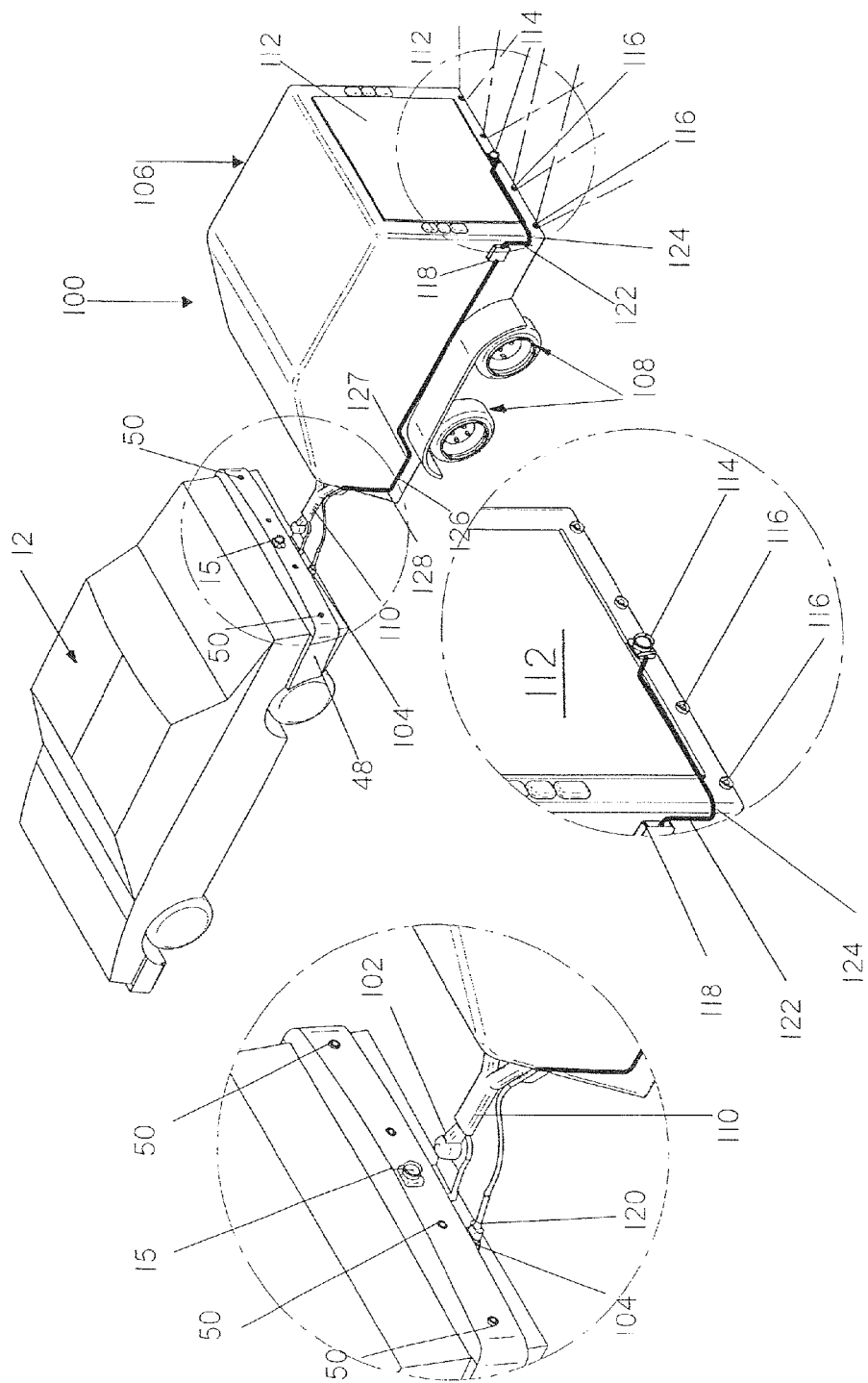
FIG. 19 is a schematic upper perspective view of a vehicle fitted with an accident prevention device in accordance with the invention towing a trailer also fitted with an accident prevention device in accordance with the invention.

FIG. 19 illustrates a vehicle towing a trailer where both the towing vehicle and the trailer have been fitted with the system. In these drawings the same reference numerals are used to refer to the towing vehicle and the components of the system 10 on the vehicle 12 as in FIG. 4A above. In the drawings the trailer is referred to generally by the reference numeral 100.

The towing vehicle 12 has an IR sensor 14 and a plurality of sonar sensors 50 mounted on its bumper 48. The towing vehicle also has a controller 20, an alarm 58 and a brake applicator 26. Further as shown in FIGS. 4A, 4B and 19, the towing vehicle has a tow hitch 102 and a services socket 104 on its rear end 38.

The trailer 100 comprises a trailer body 106 mounted on wheels 108 and a draw pole 110 at a front end of the trailer 100. The trailer 100 also has a rear end 112 and an arrangement of sensors that comprises, a centrally mounted IR sensor 114 and a plurality of sonar sensors 116, spaced apart across the width of the rear end 112. These sensors 114 and 116 function in the same way as the sensors 14 and 50 on the vehicle 12. The trailer also has a controller 118 mounted thereon that is operatively connected to the sensor 114 by means of wiring 122 and the sensors 116 are connected to the controller 118 by means of further wiring 124.

The system 10 has a services plug 120 on the draw pole 110 and wirings 126 and 127 for operatively connecting the controller 118 on the trailer 100 to the horn 58 and/or the alarm 60 on the vehicle 12. The system 10 has another wiring 128 for connecting the controller 118 to the brake applicator 26 on the vehicle 12. The wirings 126, 127 and 128 extend from the controller 118 and are routed along the trailer 100 and along the draw pole 110 and then coupled to the services plug 120. The services socket 104 has corresponding wirings operatively connecting them to the alarms 58, 60 and brake applicator 26.

The controller 20 is operatively coupled to the services socket 104 on the vehicle 12 such that when the services plug 120 is plugged therein the sensors 15, 50 on the vehicle 12 are effectively disarmed. It is necessary to engineer the system 10 to do this because otherwise the presence of the trailer 100 would be sensed by the sensors 15 and 50 when the driver engaged reverse gear and this would urgently apply the brakes of the vehicle 12.

When the services plug 120 is plugged into the services socket 104 the wiring 126 and 127 is indirectly operatively connected to the alarms 58 and 60 on the vehicle 12. Similarly the wiring 128 is also indirectly operatively connected to the brake applicator 26 on the vehicle 12. The sensors 114 and sonar sensors 116 sense for objects in a sonar sensing zone behind the trailer 100. When the sensors on the trailer identify an object meeting certain conditions they generate the same recognition signals as the sensors 15, 50 on the vehicle 12 and these are sent to the controller 20 on the vehicle 12.

In use the system 10 functions much like the system described above with reference to FIG. 4. The system is armed when the vehicle 12 engages reverse gear, and the sensors 114 and 116 on the rear end of the trailer 100 start sensing for objects behind the rear end 112 of the trailer 100. The sensors 114 sense for mammals in an IR sensing zone and the sonar sensors 116 also sense for objects in a sonar sensing zone behind the trailer 100. When the sensors on the trailer identify a mammal or an object respectively they generate the same recognition signals as the sensors 15, 50 on the vehicle 12 and these are sent to the controller 20 on the vehicle 12. For example if a small child is sensed by the sensors 114 or 116 on the trailer 100 in the path of the trailer 100 when the towing vehicle 12 is in reverse gear, the sensors 114 and 116 will send a recognition signal to the controller 118. The controller 118 will then send an accident prevention response signal to the horn 58 and alarm 60 and the brake applicator 26 on the main vehicle 12 which will then raise the alarm and brake the vehicle 12. As described above the sensors 15 and 50 on the rear end 38 of the vehicle 12 are disarmed when the services coupling 120 on the trailer 100 is coupled to the services socket 104 on the rear of the towing vehicle 12. This stops these sensors sensing the presence of the trailer 100 behind the vehicle 12.

An advantage of the system described above with reference to the drawings and also a motor vehicle incorporating the system is that it is able to recognise a risk of accident condition independently of the actions of any human being. It operates quite independently of the driver and does not rely on the driver at all for it to work. A shortcoming of prior art systems described above is that they rely on the driver for their efficacious operation. Further the system includes a loud audio alarm that sounds outside of the driver's cabin and warns people in the general area of the vehicle of the imminent danger. Further the accident brake applicator causes the brakes of the vehicle to be applied immediately when it receives a signal to do so quite independently of the actions of the driver. This stops the vehicle immediately so that it cannot run over anyone behind the vehicle. Therefore related to the first advantage is the subsidiary advantage that the system immediately applies the brakes of the vehicle, either stopping it if it is moving in the first place or bringing it to a halt if it is already moving.

Another advantage of some forms of the system described above with reference to the drawings is that it uses a passive sensor which operates by sensing passive IR energy that is radiated by a warm body such as a human body. It does not radiate its own energy and then sense reflected energy. A related advantage is that this system is very reliable at sensing human bodies within the reversing zone when the vehicle is either stationary or travelling at a slow speed. A further advantage is that IR discriminates between human bodies and inanimate objects such as walls and posts.

A yet further advantage of the systems that use both sonar and IR sensors described above with reference to the drawings is both of these types of sensors sense for a small child in the path of a reversing vehicle. These two types of sensors work on different principles and thereby increase the chance of sensing a child in the path of the vehicle and this makes the system more reliable than a system using just one type of sensor.

A yet further advantage is that the system 10 can be installed on a motor vehicle 12 either during its manufacture or it can be retrofitted after the vehicle 12 has been sold. For example the system can easily be produced as an aftermarket product and be retrofitted to an existing vehicle. Yet further the system uses fairly basic components that can be bought off the shelf and is capable of reliable and trouble free operation. Yet further the system can be manufactured and supplied to the market at a reasonable cost.

A yet further advantage of the system described above is that it will reduce the risk of reversing accidents in driveways causing death or injury to small children. This will reduce the road trauma that is caused by reversing accidents around the world each year.

It will of course be realized that the above has been given only by way of illustrative example of the invention and that all such modifications and variations thereto, as would be apparent to persons skilled in the art, are deemed to fall within the broad scope and ambit of the invention as is herein set forth.

The invention claimed is:

1. A method for preventing a reversing accident where a vehicle that is reversing a low speed collides with a person in the path of travel of the vehicle, the method comprising:
    sensing an object in the path of travel by means of a sensor arrangement that generates an object recognition signal when the sensor arrangement senses an object satisfying a predetermined condition;
    wherein the sensor arrangement comprises an IR sensor arrangement and a reflected pulse sensor arrangement that are mounted on the rear end of the vehicle, and sensing an object comprises:
        passive sensing of IR heat from a mammal with said IR sensor and generating an object recognition signal when it senses an object satisfying the condition that it radiates IR heat corresponding to a mammal, and
        transmitting pulses of electromagnetic radiation away from the rear end of the vehicle and sensing return pulses returning to the sensor arrangement, and generating an object recognition signal comprises sensing when an object is within a predetermined range of the rear end of the vehicle;
    sending the object recognition signal to a controller that is operatively coupled to the sensor arrangement; and
    sending an accident prevention response signal from the controller to a brake applicator on receiving the object recognition signal which then applies the brake of the vehicle whereby to resist movement of the vehicle.

2. A method for preventing a reversing accident according to claim 1, wherein the sensor arrangement comprises at least one IR sensor on a rear end of the vehicle, and sensing an object comprises passive sensing of IR heat from a mammal with said IR sensor and generating an object recognition signal when it senses an object satisfying the condition that it radiates IR heat corresponding to a mammal.

3. The method for preventing a reversing accident according to claim 1, wherein the sensor arrangement comprises a reflected pulse sensor arrangement on a rear end of the vehicle, and sensing an object comprises transmitting pulses of electromagnetic radiation away from the rear end, and sensing return pulses returning to the sensor arrangement, and generating an object recognition signal comprises sensing when an object is within a predetermined range of the rear end of the vehicle.

4. The method for preventing a reversing accident according to claim 1, wherein sensing an object comprises sensing when an object is within a predetermined range of between 0.5 meters and 2.0 meters of the rear end of the vehicle.

5. The method for preventing a reversing accident according to claim 1, herein transmitting pulses of electromagnetic radiation away from the rear end of the vehicle comprises transmitting pulses of sound waves or radio waves or microwaves away from the rear end of the vehicle.

6. The method for preventing a reversing accident according to claim 1, which also includes sending each accident prevention response signal to an alarm which then issues an alarm signal.

7. The method for preventing a reversing accident according to claim 1, wherein issuing an alarm signal comprises issuing an audio alarm and a visual alarm.

8. The method for preventing a reversing accident according to claim 1, wherein applying the brake of the vehicle comprises passing en electric current through a solenoid to displace a cable which is operatively connected to a brake pedal of a foot brake whereby to displace the brake pedal downward to apply the foot brake.

9. A method for preventing a reversing accident where a vehicle that is reversing a low speed collides with a person in the vehicle's path of travel, the method comprising:
    sensing an object rearward of a rear end of the vehicle by means of a sensor arrangement that generates an object recognition signal when an object is sensed that meets a predetermined condition;
    wherein the sensor arrangement comprises an IR sensor arrangement and a reflected pulse sensor arrangement that are mounted on the rear end of the vehicle, and sensing an object comprises:
        passive sensing of IR heat from a mammal with said IR sensor and generating an object recognition signal when it senses an object satisfying the condition that it radiates IR heat corresponding to a mammal, and
        transmitting pulses of electromagnetic radiation away from the rear end of the vehicle and sensing return pulses returning to the sensor arrangement, and generating an object recognition signal comprises sensing when an object is within a predetermined range of the rear end of the vehicle;

generating an accident prevention response signal on receiving the object recognition signal from the sensor arrangement, the accident prevention response signal response comprises applying the brakes of the vehicle to either bring the vehicle to a halt if it is reversing or to stop the vehicle from reversing if the vehicle is stationary.

10. The method for preventing a reversing accident according to claim 9, wherein sensing an object rearward of a rear end of the vehicle comprises sensing IR heat from a mammal using a passive IR sensor or sensing an object comprises transmitting a pulse of electromagnetic radiation away from the rear end of the vehicle and sensing for return pulses that return to the sensor arrangement.

11. The method for preventing a reversing accident according to claim 9, wherein the generating an accident prevention response signal comprises issuing an alarm.

12. An accident prevention system for use on a vehicle comprising a front end and a rear end, the accident prevention system comprising:
a sensor arrangement for mounting on the vehicle for sensing an object rearward of the rear end of the vehicle, and that generates an object recognition signal when the sensor arrangement senses an object satisfying a predetermined condition;
a controller that is operatively coupled to the sensor arrangement and that generates an accident prevention response signal on receiving an object recognition signal from the sensor arrangement;
wherein the sensor arrangement comprises a reflected pulse sensor arrangement that transmits pulses of electromagnetic radiation away from the rear end of the vehicle and senses return pulses returning to the sensor arrangement, and the sensor arrangement generates an object recognition signal, when the sensor arrangement senses an object satisfying the condition that the object is within a predetermined range of the rear end of the vehicle, and sends the object recognition signal to the controller; and
a brake applicator that is operatively coupled to a brake of the vehicle in use, the brake applicator is operatively connected to the controller and applies the brake of the vehicle when the controller generates the accident prevention response signal whereby to resist movement of the vehicle.

13. The accident prevention system for use on a vehicle according to claim 12, wherein the sensor arrangement that comprises at least one IR sensor that is mounted on the rear end of the vehicle that senses heat and generates an object recognition signal when it senses an object satisfying the condition that it radiates IR heat corresponding to a mammal.

14. The accident prevention system for use on a vehicle according to claim 12, wherein the IR sensor arrangement comprises a plurality of IR sensors that are spaced apart across the rear end of the vehicle.

15. The accident prevention system for use on a vehicle according to claim 13, wherein the reflected pulse sensor arrangement generates an object recognition signal when the reflected pulse sensor arrangement identifies objects within a range that is a distance of between 0.5 meters and 2.0 meters of the rear end of the vehicle.

16. The accident prevention system for use on a vehicle according to claim 15, wherein the reflected pulse sensor arrangement comprises one or more reflected pulse sensors positioned on the rear end of the vehicle.

17. The accident prevention system for use on a vehicle according to claim 12, wherein the sensor arrangement comprises:
an IR sensor arrangement that senses IR heat and that generates an object recognition signal when the IR sensor arrangement senses an object satisfying the condition that it radiates IR heat corresponding to a mammal, and sends it to the controller; and
a reflected pulse sensor arrangement that transmits pulses of electromagnetic radiation away from the rear end of the vehicle and senses return pulses returning to the sensor arrangement, and the sensor arrangement generates an object recognition signal, when it senses an object satisfying the condition that it is within a predetermined range of the rear end of the vehicle, and sends the object recognition signal to the controller.

18. The accident prevention system for use on a vehicle according to claim 17, wherein the IR sensor arrangement comprises one or more passive IR sensors and the reflected pulse sonar arrangement comprises a plurality of sonar sensors.

19. The accident prevention system for use on a vehicle according to claim 12, wherein the brake applicator comprises a solenoid that is operatively connected to the controller, a brake mounting member for operatively mounting to a foot brake of the vehicle in use, and a cable operatively coupling the brake mounting member to the solenoid.

20. The accident prevention system for use on a vehicle according to claim 12, further comprising an alarm that is operatively connected to the controller, and wherein the alarm issues an alarm signal on receiving an accident prevention response signal from the controller.

21. The accident prevention system for use on a vehicle according to claim 20, wherein the controller is a central processing unit contained within a control housing, and wherein the CPU is wired to the sensor arrangement and the CPU is wired to the brake applicator and to the alarm.

22. A vehicle comprising an accident prevention system installed thereon, comprising:
a vehicle body comprising a front end and a rear end mounted on ground engaging formations that permit the vehicle body to travel across a surface, the vehicle comprising at least one brake for stopping the vehicle;
a sensor arrangement mounted on the vehicle for sensing an object rearward of the rear end of the vehicle, and that generates an object recognition signal when the sensor arrangement senses an object satisfying a predetermined condition;
a controller that is operatively coupled to the sensor arrangement and that generates an accident prevention response signal on receiving an object recognition signal from the sensor arrangement;
wherein the sensor arrangement comprises an IR sensor arrangement that senses IR heat and that generates an object recognition signal when IR sensor arrangement senses an object radiating IR heat corresponding to a mammal and sends the object recognition signal to the controller; and
a reflected pulse sensor arrangement that transmits pulses of electromagnetic radiation away from the rear end of the vehicle and senses return pulses returning to the sensor arrangement, and the sensor arrangement generates an object recognition signal when the sensor arrangement senses an object within a predetermined range of the rear end of the vehicle and sends the object recognition signal to the controller; and a brake applicator that is operatively coupled to a brake, and the brake applicator is operatively connected to the controller and applies the brake when the controller generates the accident prevention response signal whereby to resist movement of the vehicle.

23. A vehicle comprising an accident prevention system installed thereon according to claim 22, wherein the sensor arrangement comprises an IR sensor arrangement that senses IR heat and that generates an object recognition signal when it senses an object satisfying the condition that it radiates IR heat corresponding to a mammal, and sends it to the controller.

24. A vehicle comprising an accident prevention system installed thereon according to claim 22, wherein the sensor arrangement comprises a reflected pulse sensor arrangement that transmits pulses of electromagnetic radiation away from the rear end of the vehicle and senses return pulses returning to the sensor arrangement, and the sensor arrangement generates an object recognition signal when the sensor arrangement senses an object satisfying the condition that the object is within a predetermined range of the rear end of the vehicle, and sends the object recognition signal to the controller.

25. A vehicle comprising an accident prevention system installed thereon according to claim 24, wherein the reflected pulse sensor arrangement comprises one or more reflected pulse sensors that are positioned on the rear end of the vehicle, and wherein the reflected pulse sensor arrangement generates an object recognition signal when the reflected pulse sensor arrangement identifies objects within a range that is a distance of between 0.5 meters and 2.0 meters from the rear end of the vehicle.

26. A vehicle comprising an accident prevention system installed thereon according to claim 25, wherein the one or more reflected pulse sensors comprises sonar sensors that pulse sound waves, or radar sensors that pulse radio waves, or microwave sensors that pulse microwaves, and the sensors sense when the reflected waves return to the sensor arrangement.

27. A vehicle comprising an accident prevention system installed thereon according to claim 22, further comprising an alarm that is operatively connected to the controller, and wherein the alarm issues an alarm signal on receiving an accident prevention response signal from the controller.

28. Software for preventing a reversing accident, the software embodied on at least one non-transitory computer readable medium and operable when executed by at least one processor to perform the method according to claim 1.

29. Software for preventing a reversing accident, the software embodied on at least one non-transitory computer readable medium and operable when executed by at least one processor to perform the method according to claim 9.

* * * * *